United States Patent [19]

Shimizu et al.

[11] Patent Number: 4,754,220
[45] Date of Patent: Jun. 28, 1988

[54] DIGITAL OUTPUT ROTATIONAL POSITION DETECTION DEVICE

[75] Inventors: Wataru Shimizu; Akira Yamashita, both of Tokyo, Japan

[73] Assignee: Kabushiki Kaisha SG, Tokyo, Japan

[21] Appl. No.: 661,197

[22] Filed: Oct. 15, 1984

Related U.S. Application Data

[62] Division of Ser. No. 311,277, Oct. 14, 1981, Pat. No. 4,612,503.

[30] Foreign Application Priority Data

Oct. 21, 1980 [JP] Japan .............................. 55-147425
Nov. 25, 1980 [JP] Japan .............................. 55-164665

[51] Int. Cl.$^4$ .......................... G01B 7/14; G08C 19/06
[52] U.S. Cl. ................................. 324/208; 340/870.35
[58] Field of Search ...................... 324/208, 207, 83 D; 340/870.32, 870.33, 870.35, 870.36; 336/135; 318/656–661; 323/348; 310/168

[56] References Cited

U.S. PATENT DOCUMENTS 3,281,655 10/1966 Blasingame .................... 340/870.32
3,634,838 1/1972 Granquist ..................... 340/870.32
4,085,363 4/1978 Gravina et al. ..................... 324/162
4,297,698 10/1981 Pauweis et al. ................ 340/870.32

Primary Examiner—Ernest F. Karlsen
Assistant Examiner—Walter E. Snow
Attorney, Agent, or Firm—Spensley Horn Jubas & Lubitz

[57] ABSTRACT

The present device comprises a stator having a plurality of poles on which primary coils and at least one secondary coil is wound, and a rotor opposing the respective poles of the stator with gaps therebetween. A clock pulse generator is provided, and the respective primary coils are separately excited by reference AC signals which are out of phase with each other and are generated in response to a count of a counter counting a clock pulse signal from the clock pulse generator. The output of the secondary coil or coils provides an output signal resulting by phase shifting the reference AC signals in accordance with the rotational position of the rotor. The phase difference between the reference AC signal and the output signal is detected by obtaining a digital count representing the phase difference in synchronization with the counting by the counter to obtain detected digital phase difference data as an absolute rotational position data.

21 Claims, 16 Drawing Sheets

FIG.1(a) FIG.1(b)
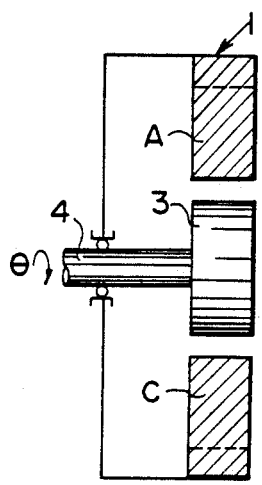
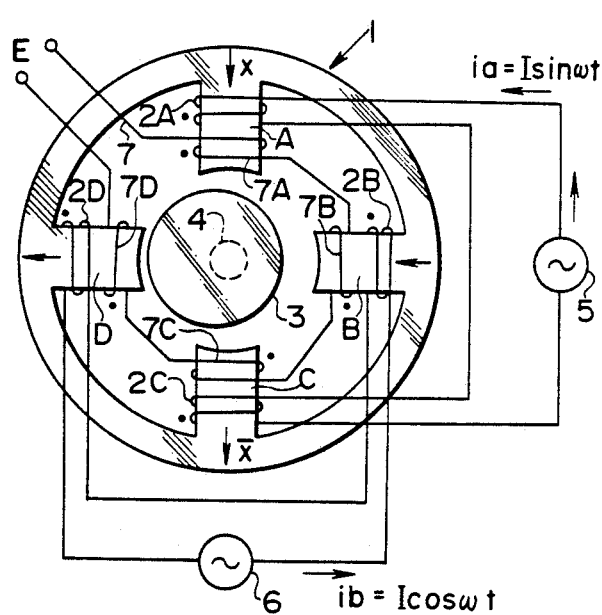
FIG.2
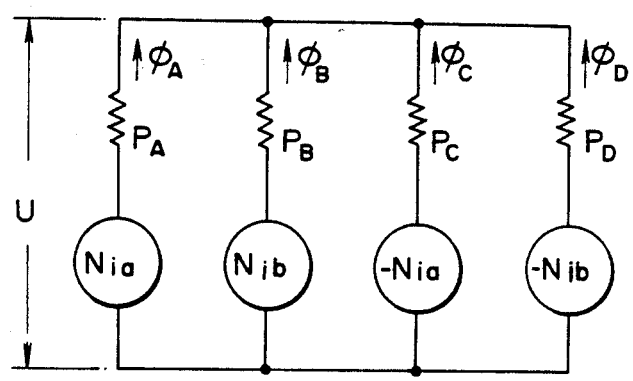

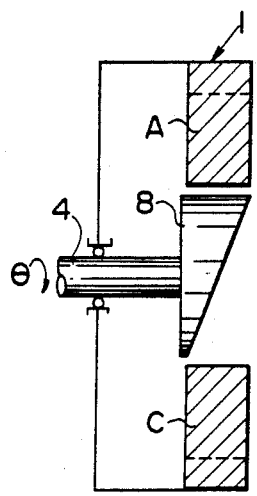
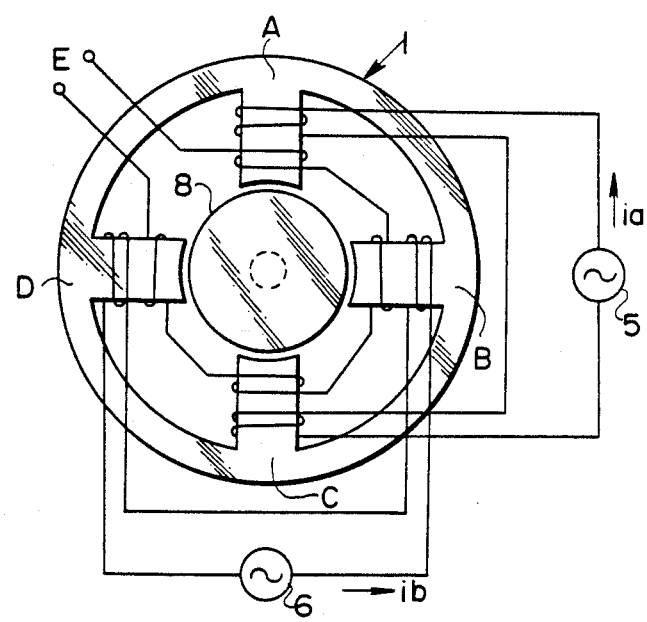
FIG.3(a)  FIG.3(b)
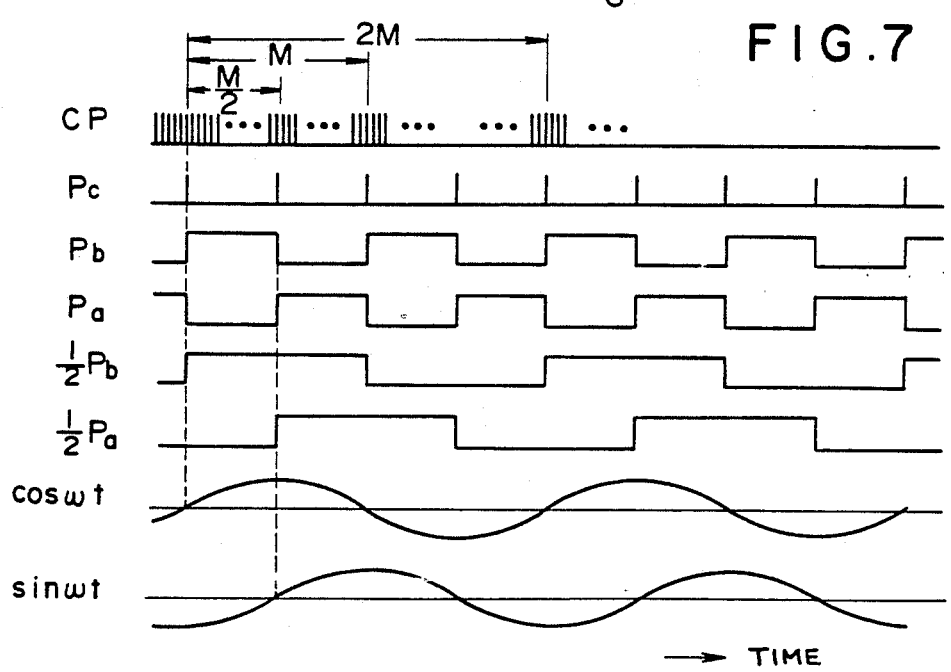
FIG.7

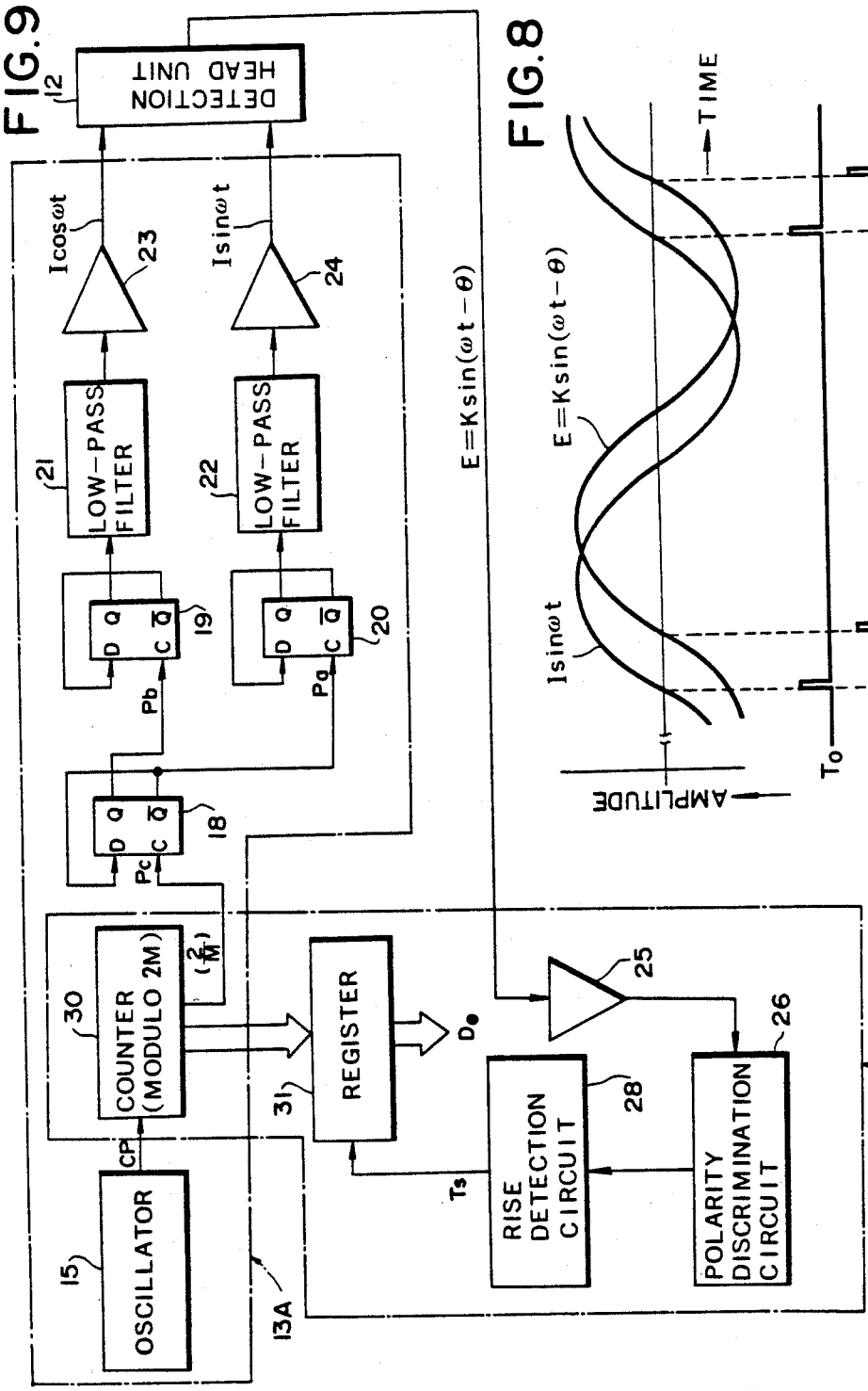

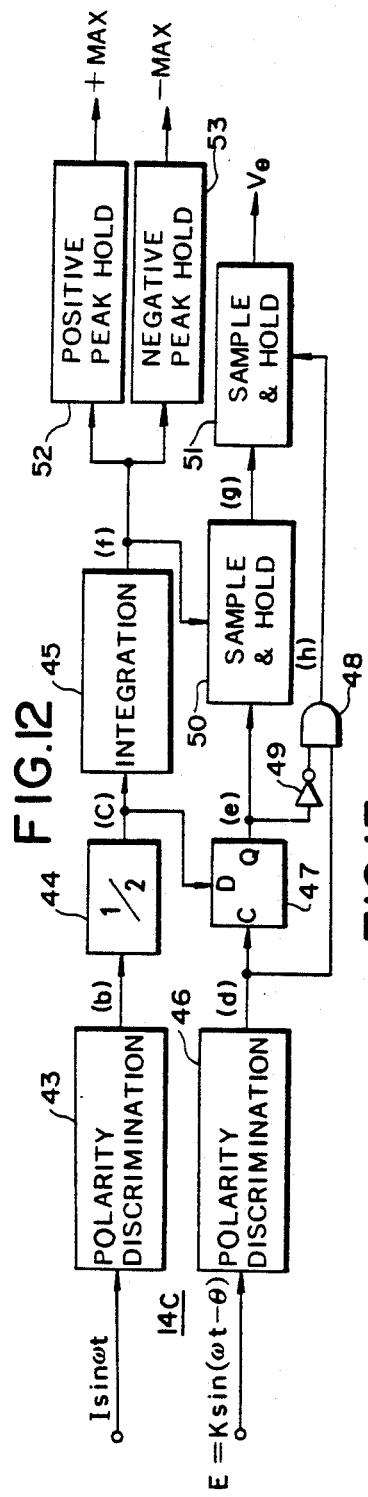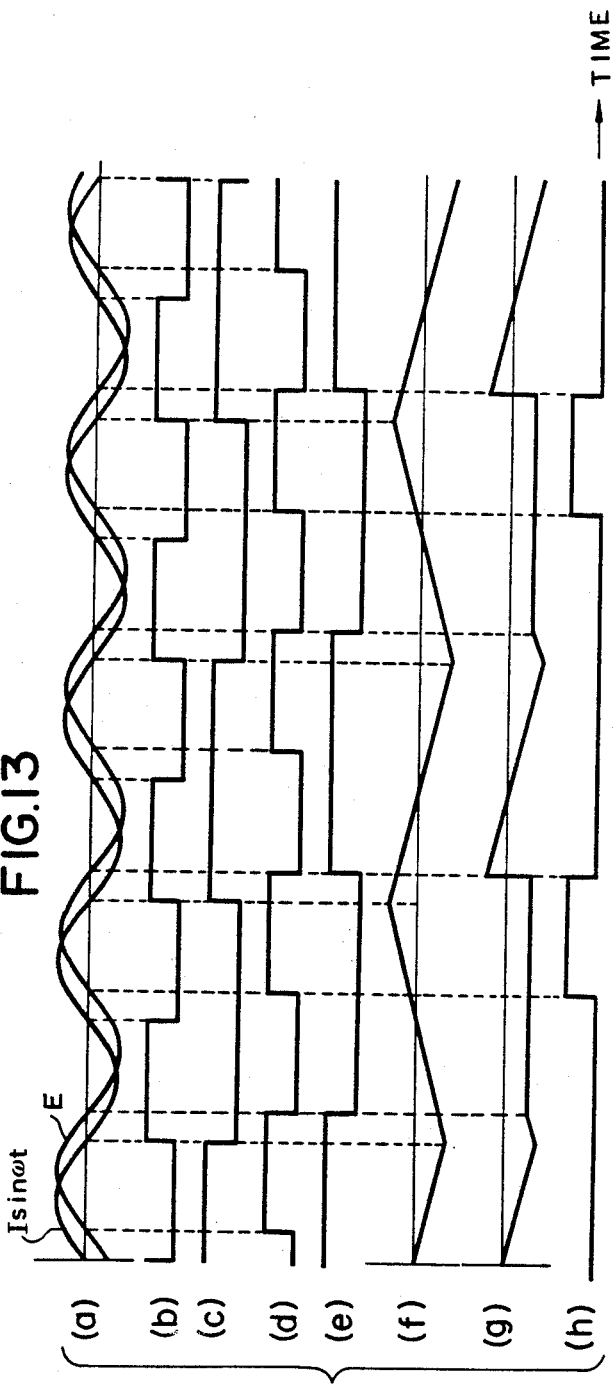

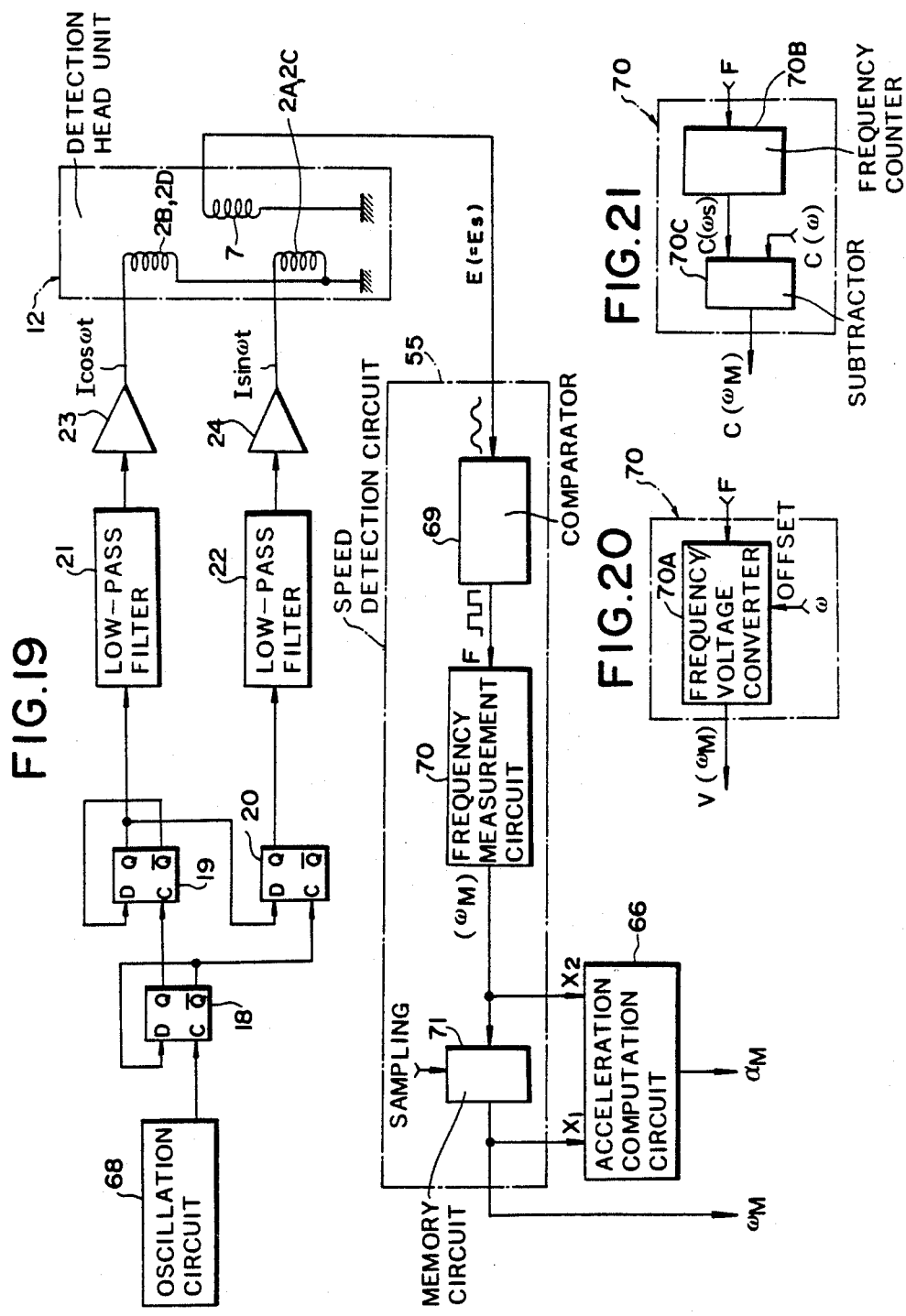

DIGITAL OUTPUT ROTATIONAL POSITION DETECTION DEVICE

RELATED APPLICATION

This application is a divisional application of our copending U.S. application Ser. No. 06/311,277 filed Oct. 14, 1981 entitled "VARIABLE RELUCTANCE TYPE ROTATION ANGLE DETECTION DEVICE", now U.S. Pat. No. 4,612,503.

BACKGROUND OF THE INVENTION

This invention relates to a variable reluctance type rotation angle detection device capable of detecting not only rotation angle but also a rotation speed and rotation acceleration together by using a common detection head unit and, more particularly, to a detection device comprising a variable reluctance type detection head unit producing an output signal by phase shifting or phase modulating a reference AC signal in accordance with a present position of rotation.

Known in the art of rotation angle detectors are a potentiometer, a resolver, a rotary differential transformer, an optical rotary encoder and the like device. A potentiometer is short in life for it is a contact type device. A resolver which needs a brush has problems in durability, high speed response and noise. Although there exists a resolver which has obviated a brush by providing a rotary transformer, provision of such rotary transformer has the disadvantage that the device requires a complicated and large device. A rotary differential transformer which obtains an analog output corresponding to a sine wave amplitude corresponding to a rotation angle is incapable of producing a linear output over all of the rotation range. A common disadvantage in the rotary differential transformer and the potentiometer is that these devices tend to cause errors due to disturbance, for they produce a voltage level corresponding to a rotation angle. For example, in these devices, variation in resistance of a coil due to change in the temperature causes variation in the level of the detection signal. Reliability in these devices is inadequate because attenuation of the level in signal transmission paths from the detector to a circuit utilizing the detection signal differs depending upon the distance of the transmission paths. Further, variation in the level due to noise is directly outputted as a detection error. For the various reasons stated above, it is difficult to construct an absolute encoder of a high resolution by the prior art electromagnetic type rotation angle detector. On the other hand, the optical type encoder which has a function of an absolute encoder is disadvantageous in that its resolution of detection is lifted by an area of a pattern disk so that an increase in resolution necessitates an increase in the area of the pattern disk with a result that a large pattern disk and, accordingly, a large detector is required. The optical type encoder is also disadvantageous in that it is generally expensive, that the whole pattern disk must be replaced if change in resolution or a code type of data is required and that the pattern disk tends to get broken if it is made of a glass plate so that an environment in which it can be used is limited.

Prior art rotation speed meters are generally classified into those which produce an analog voltage (or current) proportionate to the rotation speed (i.e., revolution number per unit time) and those which produce a pulse train proportionate to the rotation speed. Common disadvantages in the devices producing an analog output are that, as described above, they tend to cause errors due to disturbance and that increase in resolution is limited. The devices producing a pulse train are also limited in resolution and rangebility (range of detectable revolution number), for the number of pulse produced per one rotation is limited due to the mechanism of the device. Besides, there has been no rotation acceleration meter having a wide detection range and a high resolution.

THE SUMMARY OF THE INVENTION

It is, therefore, an object of the present invention to provide a variable reluctance type rotation angle detection device which is of a non-contact type, simple and compact in construction, capable of performing an accurate detection without being affected by variation in the output level due to disturbance, durable in hard environments and possessed of high resolution.

It is another object of the invention to provide a detection device which is of a high resolution and capable of detecting a rotation speed in a wide range.

It is another object of the invention to provide a detection device which is of a high resolution and capable of detecting rotation acceleration in a wide range.

It is another object of the invention to provide a detection device capable of detecting not only a rotation angle but also rotation speed and rotation acceleration by a common detection head unit.

It is still another object of the invention to provide a detection device capable of detecting the rotation angle, rotation speed and rotation acceleration with a higher resolution. This object can be achieved by a rotation angle detection device including a stator having poles and primary and secondary coils wound on the poles and a rotor of such a configuration that reluctance of a magnetic circuit for each pole is changed in accordance with a rotation angle output signal being produced by the secondary coils on the basis of reference AC signals which have been phase shifted in accordance with the rotation angle of the rotor by exciting the primary coils of the respective stator poles by the reference AC signals which are different in phase from one another. Data corresponding to the rotation angle can be obtained by detecting phase difference between the reference AC signal and the output signal of the secondary coil. When the rotor is being rotated, the output signal of the secondary coil is a signal produced by phase modulating the reference AC signal in accordance with the rotation speed. Accordingly, data corresponding to the rotation speed can be obtained by detecting difference in the frequency or period between the reference AC signal and the output signal of the secondary coil. Besides, by obtaining data corresponding to the rotation speed momentarily, change in the rotation speed, i.e., rotation acceleration, can be computed on the basis of difference between a newly obtained value and a previous value of the rotation speed. Thus, the rotation angle, the rotation speed and the rotation acceleration can be detected together by using a single rotation angle detection device.

Since no coil is wound on the rotor, the detection device according to the invention is of a brushless type which is naturally durable. Besides, the detection device enjoys a simplified construction because no rotary transformer which was indispensable in the prior art brushless detection device is required. Since the detection device has employed a system of obtaining an angle by detecting phase difference, an accurate detecting of angle can be made regardless of variation in the output level due to disturbance. Resolution of detection of the rotation angle can be increased simply by making a circuit design for increasing resolution of detecting the phase difference such as increasing the rate of a clock pulse used in a counter for counting phase difference. Accordingly, no large device such as the prior art optical type rotary encoder is required. The detection device according to the invention, which has no fragile component part such as a glass pattern disk, is strong in hard environments. Further, since no load is applied from the side of the detection device on a shaft in which detection is to be made, there is scarcely limitation in the load on the shaft. Furthermore, absolute data of the rotation angle can be obtained under any temperature condition and in any environment by using, for detection of phase difference, the same clock pulse as that used for establishing the frequency of the reference AC signal.

The stator preferably comprises plural pairs of poles which are excited in opposite phase to each other and the rotor is so configured that differential reluctance change is produced between the two poles constituting a pair. Increase in resolution of detection can be brought about by this arrangement.

Further increase in resolution of detection can be realized by providing teeth of a certain pitch about the rotor and providing corresponding teeth also about the stator poles. By determining relationship between the rotor teeth and the stator teeth in such a manner that change in reluctance which completes one cycle for each pitch of the rotor teeth, a relative rotation angle within one pitch of the teeth can be detected with a high resolution.

BRIEF DESCRIPTION OF THE DRAWINGS

In the accompanying drawings:

FIG. 1(a) is a side sectional view of an embodiment of the detection head in the rotation angle detection device according to the invention;

FIG. 1(b) is a front view of the embodiment shown in FIG. 1(a);

FIG. 2 is a circuit diagram of a circuit equivalent to a magnetic circuit in the detection head unit shown in FIGS. 1(a) and 1(b);

FIG. 3(a) is a side sectional view of another embodiment of the detection head unit according to the invention;

FIG. 3(b) is a front view of the embodiments shown in FIG. 3(a);

FIG. 7 is a time chart showing the operation of the reference AC signal generation circuit in FIG. 6;

FIG. 8 is a time chart showing the operation of the phase angle detection circuit shown in FIG. 6;

FIG. 9 is a block diagram showing a modified example of the reference AC signal generation circuit and the phase difference detection circuit shown in FIG. 6;

FIG. 12 is a block diagram showing another example of the phase difference detection circuit detecting the phase difference in an analog amount;

FIG. 13 is a time chart showing examples of output waveforms of some portions in the circuit shown in FIG. 12;

FIG. 19 is a block diagram showing another example of the circuit for detecting the rotation speed and rotation acceleration;

FIGS. 20, 21 and 22 are block diagrams respectively showing an example of the frequency measurement circuit in FIG. 19;

DESCRIPTION OF PREFERRED EMBODIMENTS

Figure 4A:
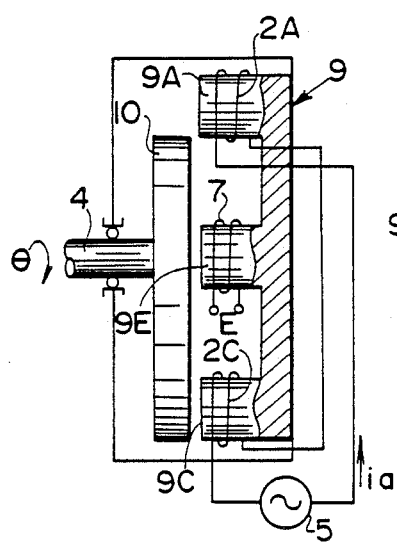
FIG. 4(a) is a side sectional view of another embodiment of the detection head unit according to the invention.
Figure 4B:
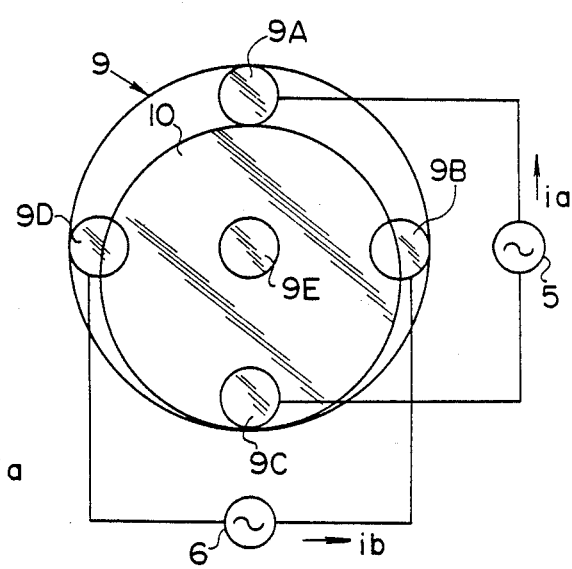
FIG. 4(b) is a front view of the embodiment shown in FIG. 4(a)
Figure 5A:
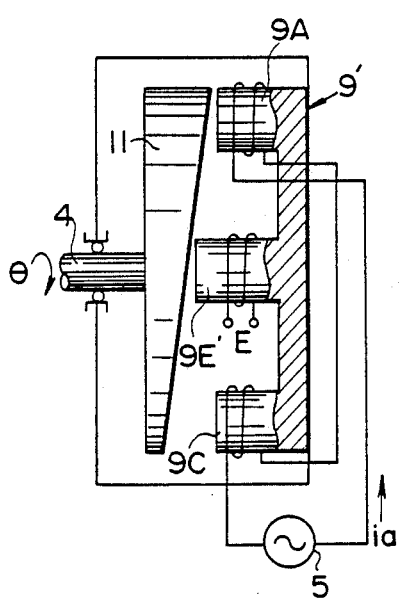
FIG. 5(a) is a side sectional view of still another embodiment of the detection head unit according to the invention.
Figure 5B:
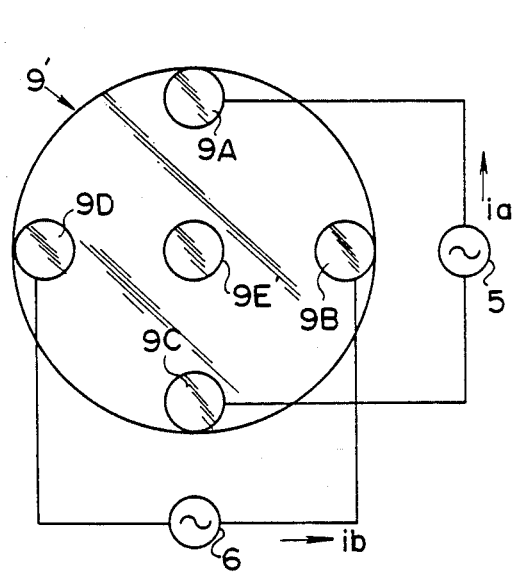
FIG. 5(b) is a front view of the embodiment shown in FIG. 5(a)

Referring to FIGS. 1(a) and 1(b), a stator 1 has four inwardly projection poles A, B, C and D disposed with an interval of 90° relative to each adjacent pole in a circumferential direction. The radially opposing poles A and C constitute a pole pair and the radially opposing poles B and D constitute another pole pair. Primary coils 2A and 2C (2B and 2D) are wound on the pole pair A and C (B and D) in a differential manner. Assuming that the direction of flux toward the end of the respective poles is a positive phase, the respective coils are wound in such a manner that fluxes produced by the windings 2A and 2C (or 2B and 2D) are in opposite phase to each other. More specifically, the primary coils 2A and 2C are wound in a differential manner so that, if a flux is produced in the pole A by the primary coil 2A in a direction indicated by an arrow X, i.e., in a direction coming from the root of the pole A, a flux is produced in the opposite pole C by the primary coil 2C in a direction indicated by an arrow X, i.e., in a direction entering the root of the pole C. By this arrangement, a flow of flux of the same direction is produced in the pole pair A and C through a rotor 3 provided in a central space between the pole pair. Likewise, the primary coils 2B and 2C are wound on the other pole pair B and D. The reason for winding the primary coils in a differential manner is that, as will be described later, the pole pair A and C is excited by an AC signal different from an AC singal used for exciting the pole pair B and D so that a common flow of flux should be guaranteed in the poles (A" and C" or B" and D") which are excited by the common AC signal. The rotor 3 consists of a core only and no coils are wound thereon. The cores of the stator 1 and the rotor 3 are of course made of materials of a relatively high permeability.

The rotor 3 opposing the respective ends of the poles A-D with a suitable gap is rotated integrally with a rotating shaft 4. A rotation angle 8 to be detected is given to the shaft 4. The rotor 3 has such a configuration that reluctance of magnetic paths passing the poles A, B, C and D is changed in accordance with the rotation angle $\theta$. In the embodiment shown in FIG. 1, the rotor 3 is of a cylindrical configuration and is mounted on the shaft 4 eccentrically to the axis of the shaft 4. Owing to this eccentric cylindrical configuration, the length of the gap between the peripheral surface of the rotor 3 and each of the poles A, B, C and D changes in accordance with change in the rotation angle $\theta$. In response to the change in this gap, change in reluctance corresponding to trigonometric function for one cycle is produced in the respective poles A, B, C and D of each rotation of the rotor 3.

The pole pair consisting of the poles A and C and the pole pair consisting of the poles B and D are excited separately and individually by AC signals which are out of phase by 90°. In the embodiment shown in FIG. 1, the primary coils 2A and 2C on the poles A and C are connected in series and a sine wave signal $i_a = I \sin \omega t$ is applied to these coils from an oscillator 5. The primary coils 2B and 2D on the poles B and D are connected in series and a cosine wave signal $i_b = I \cos \omega t$ is applied to these coils from an oscillator 6. It should be noted that while the primary coils 2A and 2C appear as if they were connected in series and in phase with each other if the direction of winding only is observed, they are actually connected in series but in opposite phase to each other due to the directions of the poles A and C on which these coils are wound, i.e., directions of the fluxes produced in these poles (in other words, these coils are wound in a differential manner). The same is the case with the primary coils 2B and 2D.

A secondary coil 7 is provided to the stator 1 to collect the voltage induced by the poles A, B, C, and D. In the embodiment shown in FIG. 1, secondary coils 7A and 7C are wound around the poles A and C in phase with each other but in opposite phase to other secondary coils 7B and 7D which are wound around the poles B and D in phase to each other. These secondary coils 7A to 7D are connected in series to output the signal E which is the total of the voltages induced by the poles A, B, C, and D. The signal E is shifted in phase by the phase angle corresponding to the rotation angle $\theta$ of the rotor 3 with respect to the phase of the exciting reference AC signal $i_a = I \sin \omega t$ or $i_b = I \cos \omega t$. While readily confirmable by a test device, this may be provided as follows.

An equivalent circuit of the magnetic circuit formed in the detection head unit in FIG. 1 is schematically shown in FIG. 2 wherein N indicates the number of turns of the primary coils 2A, 2B, 2C and 2D while $i_a$ and $i_b$ indicate the instantaneous current values of the exciting AC signals I sin $\omega t$ and I cos $\omega t$ so that Nia, Nib, −Nia, and −Nib indicate the magnetomotive forces generated by the primary coils 2A to 2D of the poles A to D, respectively. $P_A$, $P_B$, $P_C$, and $P_D$ indicate permeances generated by the gaps between the rotor 3 and the poles A, B, C, and D. As the rotor 3 is of such configuration that the change in reluctance of the poles corresponds to the trigonometric function for one cycle in each rotation of the rotor 3 as earlier mentioned, the permeances $P_A$ to $P_D$ are each expressed by Equations (1) set out below. In other words, the rotor 3 is so formed and disposed as to produce such changes in permeance as expressed by Equations (1) in response to the rotation angle $\theta$ and such requirement can be met with ease by an eccentrically disposed rotor as described above.

$$P_A = P_0 + P_1 \sin \theta$$
$$P_B = P_0 - P_1 \cos \theta$$
$$P_C = P_0 - P_1 \sin \theta$$
$$P_D = P_0 + P_1 \cos \theta$$
(1)

$P_0$ and $P_1$ are constants determined in accordance with the size and permeability, etc. of the rotor 3. In Equations (1), the rotation angle $\theta$ is 0° when the gap between the rotor 3 and the pole D is at a minimum as shown in FIG. 1(b). The figures $\phi_A$, $\phi_B$, $\phi_C$, and $\phi_D$ indicate the values of flux passing through the gaps between the rotor 3 and the poles A, B, C, and D, respectively. As obvious from the equivalent circuit, they are in such relation to one another as:

$$\phi_A + \phi_B + \phi_C + \phi_D = 0 \quad \ldots (2)$$

Magnetic potential U of the entire equivalent circuit is expressed as, $$U = Nia + \frac{\theta_A}{P_A} = Nib + \frac{\theta_B}{P_B} \quad (3)$$
$$= -Nia + \frac{\theta_C}{P_C} = -Nib + \frac{\theta_D}{P_D}$$

The flux values $\phi_A$ to $\phi_D$ can therefore be expressed as, $$\begin{aligned} \phi_A &= (U - Nia) P_A \\ \phi_B &= (U - Nib) P_B \\ \phi_C &= (U + Nia) P_C \\ \phi_D &= (U + Nib) P_D \end{aligned} \quad (4)$$

The voltages $e_A$, $e_B$, $e_C$, and $e_D$ induced by the secondary coils 7A, 7B, 7C and 7D in accordance with the gaps between the rotor 3 and the poles A to D are expressed, with $N_2$ indicating the number of turns of the secondary coils 7A to 7D, as, $$\begin{aligned} e_A &= N_2 \frac{d}{dt} \phi_A \\ e_B &= -N_2 \frac{d}{dt} \phi_B \\ e_C &= N_2 \frac{d}{dt} \phi_C \\ e_D &= -N_2 \frac{d}{dt} \phi_D \end{aligned} \quad (5)$$

The synthesized output signal E by the secondary coil 7 (7A to 7D) may be expressed using Equations (5), (4), (3), (1) as well as $i_a = I \sin \omega t$ and $i_b = I \cos \omega t$ as follows:

$$\begin{aligned} E &= e_A + e_B + e_C + e_D \quad (6) \\ &= N_2 \frac{d}{dt} (\phi_A - \phi_B + \phi_C - \phi_D) \\ &= N_2 \frac{d}{dt} \{(U - Ni_a) P_A - (U - Ni_b) P_B + \\ &\quad (U + Ni_a) P_c - (U + Ni_b) P_D\} \\ &= N_2 \frac{d}{dt} (U(P_A - P_B + P_c - P_D) - \\ &\quad Ni_a(P_A - P_C) + Ni_b (P_B - P_D) \\ &= N_2 \frac{d}{dt} (-2Ni_a P_1 \sin\theta - 2Ni_b P_1 \cos\theta) \\ &= 2N_2 NP_1 \frac{d}{dt} (-I \sin\omega t \sin\theta - I \cos\omega t \cos\theta) \\ &= 2N_2 NP_1 I(-\cos\omega t \sin\theta + \sin\omega t \cos\theta) \\ &= 2N_2 NP_1 I \sin(\omega t - \theta) \end{aligned}$$

Here, it is known from Equations (1) that $P_A - P_B + P_C - P_D = 0$. Substituting K for the coefficient $2N_2 NP_1 I$ which is constant, the following equation $$E = K \sin(\omega t - \theta) \quad (7)$$

is obtained. As Equation (7) shows clearly, the output signal E is shifted in phase by the phase angle corresponding to the rotation angle $\theta$ with respect to the phase of the reference AC signal $I \sin \omega t$.

FIG. 3(a) and FIG. 3(b) show an embodiment of the invention wherein the stator 1 is of the same arrangement as in the embodiment shown in FIG. 1 while a rotor 8 varies from the rotor 3 shown in FIG. 1 in that the rotor 8 is cylindrical with a free end obliquely cut and is coaxially mounted on the shaft 4. The gaps between the turning rotor 8 and the ends of the poles A to D do not vary but the area with which the turning rotor 8 opposes the pole ends changes according to the rotation angle $\theta$ of the rotor 8. The rotor 8 shown in FIG. 3 is thus capable, as the rotor 3 shown in FIG. 1, of altering the reluctance caused by the gaps between the rotor 8 and the poles A to D according to the rotation angle $\theta$. In other words, the permeance can be altered in the same manner as shown in Equations (1).

FIGS. 4(a), 4(b) and FIGS. 5(a), 5(b) show embodiments stators 9 and 9' which are modifications of the stator 1 shown in FIG. 1 and FIG. 3. The stator 9 shown in FIG. 4 has four poles 9A, 9B, 9C and 9D disposed with an interval of 90° relative to each adjacent pole in a circumferential direction and an output pole 9E disposed on the line extended from the shaft 4. Similarly to the embodiment shown in FIG. 1, the pole pair 9A and 9C has the primary coils 2A and 2C wound thereon and is excited by a sine wave signal $i_a = I \sin \omega t$ while the other pole pair 9B and 9D has the primary coils 2B and 2D wound thereon and is excited by a cosine wave signal $i_b = I \cos \omega t$. On the output pole 9E is wound the secondary coil 7 which by itself is capable of collecting the composite signal E of the induced voltages by the poles 9A to 9D. While in the embodiments shown in FIG. 1 and FIG. 3, the poles A to D are disposed in radial directions, the poles 9A to 9E are disposed in axial directions in the embodiments shown in FIG. 4 and FIG. 5. Referring to FIG. 4, a rotor 10 is a disk eccentrically mounted on the shaft 4. The distance between the rotor 10 and the ends of the poles 9A to 9D remains constant while the rotor 10 rotates but the area with which the rotor 10 opposes each pole varies according to the rotation angle $\theta$ so that the permeance can be altered in the same manner as shown by Equations (1).

The stator 9' shown in FIG. 5 is of the same structure as the stator 9 shown in FIG. 4 except for the output pole 9E' which is a little longer than the other poles 9A to 9D. The rotor 11 is a cylinder with an oblique free end so that the gaps between the rotor 11 and the poles 9A to 9D change according to the rotation angle $\theta$. Permeance can therefore be altered in this embodiment in the same way as indicated by Equations (1).

The AC signals to excite the pole pairs A and C (9A and 9C) as well as B and D (9B and 9D) are not limited to sine and cosine wave signals but may be a combination of a sine wave signals and an inverted signal of a cosine wave signal ($-\cos \omega t$) or a combination of a cosine wave signal and an inverted signal of a sine wave signal ($-\sin \omega t$) provided that one AC signal is 90° out of phase with the other.

FIGS. 6 through 13 show embodiment for obtaining data on the rotation angle of the rotor based on the output of the detection head units illustrated in FIGS. 1, 3, 4 and 5.

Figure 6:
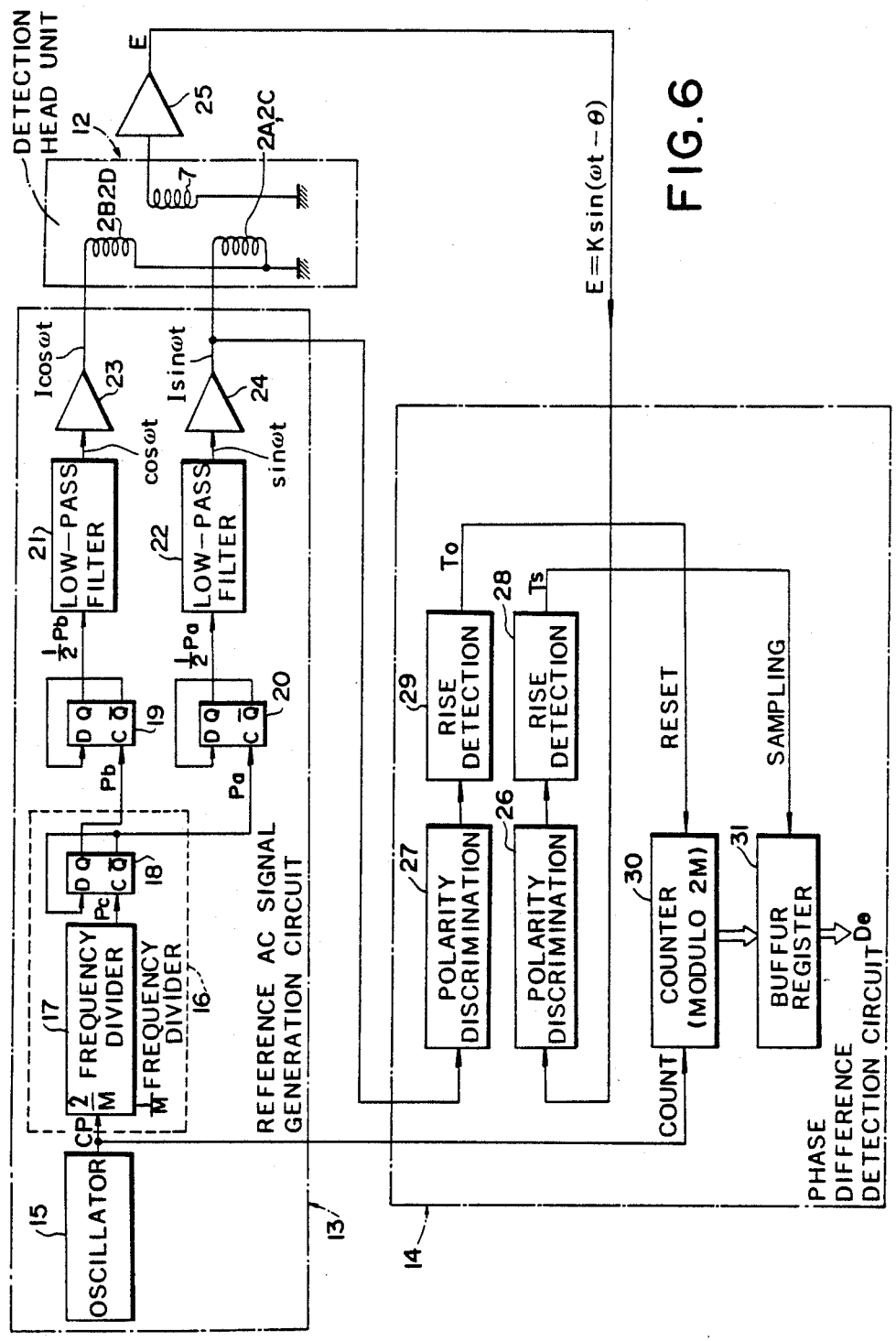
FIG. 6 is a block diagram showing an example of a reference AC signal generation circuit and a phase difference detection circuit in the rotation angle detection device according to the invention.

Referring to FIG. 6, a detection head unit 12 has the stator 1 (9, 9') and the rotor 3 (8, 10, 11) shown in FIGS. 1, 3, 4 or 5. With regard to the detection head unit 12, the primary coils 2A, 2C and 2B, 2D as well as the secondary coil 7 are schematically shown but illustration of the other parts are omitted. The embodiment shown in FIG. 6 consists mainly of a reference AC signal generation circuit 13 and a phase difference detection circuit 14 for obtaining data on the rotation angle based on phase shift. An oscillator 15 oscillates a high-rate clock pulse CP. A frequency division circuit 16 frequency divides said clock pulse CP by M to output a duty 50% pulse Pb and an inverted signal Pa of said pulse Pb (M is any given integer). More specifically, the frequency division circuit, comprising a 2/M frequency divider 17 and a ½ flip-flop circuit 18, obtains from the 2/M frequency divider 17 a pulse Pc namely, the 2/M-frequency-divided clock pulse CP and then frequency divides that pulse Pc by 2 through the flip-flop circuit 18. As a result, the flip-flop circuit 18 outputs a 50% duty cycle square wave pulse Pb with a one M-th the frequency of the clock pulse CP from the output (Q) and outputs a square wave pulse Pa namely, inverted pulse Pb from the inverted output ($\overline{Q}$). The pulses Pb and Pa, one 180° out of phase with another, are applied to ½-frequency-dividing flip-flop circuits 19, and 20 respectively to halve the frequencies of the pulses Pb and Pa and obtain pulses ½ Pb and ½ Pa. FIG. 7 indicates the pulses CP, Pc, Pb, Pa, ½ Pb, and ½ Pa for comparison. It is noted that the pulses ½ Pb and ½ Pa which are respectively outputted from the flip-flop circuits 19 and 20 have a one 2M-th the frequency of the clock pulse CP and are 90° out of phase with one another. The pulses ½ Pb and ½ Pa are applied to low-pass filters 21 and 22 respectively to obtain fundamental wave components. Suppose a cosine wave signal cos ωt is outputted from the low-pass filter 21, then a sine wave signal sin ωt is necessarily outputted from the low-pass filter 22. The signal cos ωt outputted from the low-pass filter 21 is amplified by an amplifier 23 to obtain the signal I cos ωt which in turn is applied to the primary windings 2B and 2D wound on the pole pair B and D (9B and 9D). The signal sin ωt outputted from the low-pass filter 22 is amplified by an amplifier 24 to obtain the signal I sin ωt which in turn is applied to the primary windings 2A and 2C wound on the other pole pair A and C (9A and 9C).

As above mentioned, from the output winding 7 is obtained the AC signals E=K sin (ωt−θ) which is shifted in phase with respect to the signal K sin ωt by the phase angle corresponding to the rotation angle θ. The output signal E is applied through an amplifier 25 to a polarity discrimination circuit 26. To another polarity discrimination circuit 27 is applied one of the exciting AC signals I sin ωt through the amplifier 24. The polarity discrimination circuits 26 and 27, composed of comparators, output "1" when the amplitude of the input signal (K sin (ωt−θ), I sin ωt) is of a positive polarity and output "0" when such amplitude is of a negative polarity.

The outputs from the polarity discrimination circuits 26 and 27 are respectively applied to rise detection circuits 28 and 29, namely, monostable multivibrators which output one shot of short pulse when the input signal rises to "1". Therefore, as shown in FIG. 8, when the phase angle (ωt−θ) of the rotation angle detection signal E is 0°, the rise detection circuit 28 outputs a rise detection pulse Ts while, when the phase angle ωt of the exciting AC signal I sin ωt is 0°, the rise detection circuit 29 outputs a rise detection pulse To. The rotation angle detection signal E=K sin (ωt−θ) is behind the exciting AC signal I sin ωt by a phase angle corresponding to the rotation angle θ. Therefore, the rise detection pulse Ts follows the rise detection pulse To at a time interval corresponding to the phase difference θ.

It is possible to obtain data corresponding to the phase difference θ (rotation angle) by counting the time interval between the rise detection pulses To and Ts with a counter 30 to which is applied the clock pulse CP sent by the oscillator 15. The exciting AC signals I sin ωt and I cos ωt have a one M-th the frequency of the clock pulse CP so that one cycle of the clock pulse CP corresponds to the absolute phase value of $$\frac{2\pi}{2M} = \frac{\pi}{M} \text{ (radian)}.$$

A count "1" given by the counter 30, therefore, corresponds to the absolute phase value of π/M (radian). The counter 30 of modulo 2M should preferably be employed so as to be capable of counting the value $$\left(2\pi \div \frac{\pi}{M} = 2M\right)$$

corresponding to the largest phase difference (largest rotation angle) of 360° (2π). To the counter 30 is applied as a reset input the pulse To representing phase 0 of the exciting AC signal I sin ωt. The counter 30, therefore, is reset every time the exciting AC signal I sin ωt is in phase 0.

The output of the counter 30 is applied to a buffer register 31 to which is given as a sampling clock input a pulse Ts representing phase ωt−θ=0 of the rotation angle detection signal K sin (ωt−θ). A count given by the counter 30 is transmitted to the buffer register 31 at every generation of the pulse Ts so that the buffer register 31 receives a count corresponding to the phase difference, namely, rotation angle θ. Said count given to the buffer register 31 is the absolute value data Dθ indicating the rotation angle θ. That is, as earlier mentioned, since a count "1" corresponds to the absolute phase value of π/M (radian), the count data Dθ corresponding to the rotation angle θ (radian) is the absolute value data θ/π M.

It is thus possible to compose an absolute rotary encoder by using a signal identical to the clock pulse CP which determines the frequency of the exciting AC signal for calculating the phase difference θ. Furthermore, it is possible to determine resolution of the encoder as desired by freely fixing the value of M. Specific arrangements of the circuits 13 and 14 are not limited to those shown in FIG. 6 but may be freely modified. For the counter 30 may be used not only a binary counter but a binary-coded decimal counter as well as other counters of suitable code forms. By freely selecting the form of counter to be used, absolute rotation angle data Dθ is available in a desired data form (binary, binary-coded decimal, or the like). Also, if a counter and a buffer register each of edge trigger type are used for the counter 30 and a register 31 respectively, it is possible, without the rise detection circuits 28 or 29, to trigger the counter by the rise of the output pulses of the circuits 26 and 27.

FIG. 9 shows an example wherein the 2/M frequency divider 17 shown in FIG. 6 is omitted while the counter 30 of modulo 2M is shared by a reference AC signal generation circuit 13A and the phase difference detection circuit 14. In FIG. 9, the same reference figures as used in FIG. 6 designate circuits performing like functions. The bit with a one fourth the weight of the most significant bit, namely, an input at 2/M frequency division stage is applied to the flip-flop circuit 18 as pulse Pc. Based on that pulse Pc, the sine wave signal I sin $\omega t$ and cosine wave signal I cos $\omega t$ are generated through the circuits 18 to 24 as in the example shown in FIG. 6. The output signal E=K sin ($\omega t - \theta$) of the detection head unit 12 is processed by the circuits 25, 26 and 28 as in the case shown in FIG. 6 and as a result, the pulse Ts corresponding to said output signal E in phase 0 is given to the sampling control input of the register 31. To the data input of the register 31 is given the count output of the counter 30. The digital data D$\theta$ corresponding to the phase difference $\theta$ are thus memorized by the register 31 as in the example shown in FIG. 6.

Figure 10:
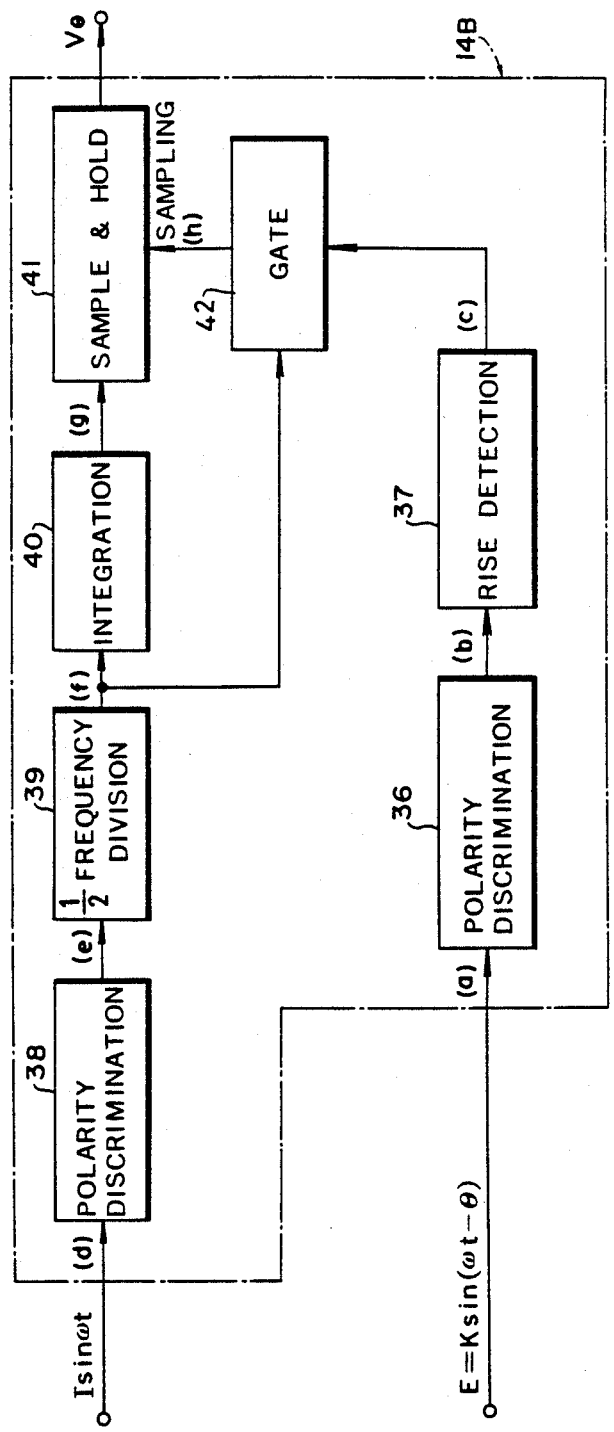
FIG. 10 is a block diagram showing an example of a phase difference detection circuit which detects the phase difference in an analog quantity.
Figure 11:
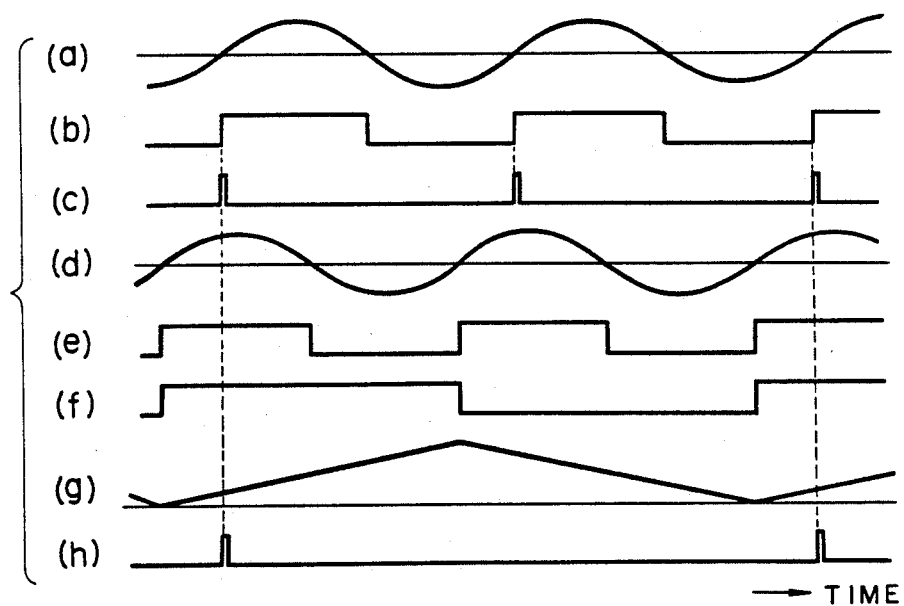
FIG. 11 is a time chart showing examples of output waveforms in some portions in the circuit of FIG. 10.

While the angle data D$\theta$ is obtained in digital by the phase difference detection circuits 14, 14A shown in FIGS. 6 and 9 respectively, they may be obtained in analog as shown in FIGS. 10 and 12.

In FIG. 10, to a phase difference detection circuit 14B are applied the reference AC signal I sin $\omega t$ and the output signal E of the detection head unit. Supposing the output signal E has a wave form as shown in FIG. 11(a), a polarity discrimination circuit 36 outputs "1" in response to a positive polarity and "0" in response to a negative polarity as shown in FIG. 11(b). A rise detection circuit 37 outputs short pulses as shown in FIG. 11(c) in response to the rise timing of the output (b) of the polarity discrimination circuit 36. The reference AC signal I sin $\omega t$ is rectified though the polarity discrimination circuit 38 as shown in FIGS. 11(d), (e) and then applied to the ½ frequency division circuit 39 from which is obtained the output (f) that repeats "1" and "0" for every one cycle of the reference AC signal I sin $\omega t$. The output (f) of the ½ frequency division circuit 39 is given to an integration circuit 40 to obtain an analog voltage signal (g) corresponding to the length of time elapsed as from the rise point or fall point of the frequency division circuit output (f) as shown in FIG. 11(g). The output (g) of the integration circuit 40 is applied to a sample and hold circuit 41 to be sampled at a timing of the phase angle of the signal E (FIG. 8(a))=0°. To the sampling control input of the sample and hold circuit 41 is given an output (c) of the rise detection circuit 37 through a gate 42 which is enabled to allow the sample and hold circuit 41 to receive the output pulse C of the rise detection circuit 37 when the output (f) of the ½ frequency division circuit 39 is "1" but inhibits the pulse (c) when the output (f) is "0". The gate 42 is provided to inhibit the sampling of the negatively inclined output (g) which the integration circuit 40 gives when the output (f) of the ½ frequency division circuit 39 is "0" as shown in FIG. 11(g). Consequently, a sampling pulse (h) is sent to the circuit 41 through the gate 42 when the output (g) of the integration circuit 40 is of a positive inclination as shown in FIG. 11(h). The sample and hold circuit 41 thus carries out sampling every other cycle to output analog DC voltage V$\theta$ corresponding to the phase difference $\theta$ (machine position to be detected) between the reference AC signal I sin $\omega t$ and the detection head output signal E.

FIG. 12 shows another example of the phase difference detection circuit 14C which detects the phase difference $\theta$ in analog and which comprises a polarity discrimination circuit 43 to which the reference signal I sin $\omega t$ is applied, ½ frequency divider circuit 44 and integration circuit 45 respectively operating in the same manner as the circuits 38, 39 and 40 shown in FIG. 10. The output signal E of the detection head unit is given to the polarity discrimination circuit 46 of which output is transmitted to a D flip-flop circuit 47 as well as to an AND gate 48. To D input of the D flip-flop circuit 47 is given the output of the ½ frequency division circuit 44. The output signal of the flip-flop circuit 47 is given to the sampling control input of a sample and hold circuit 50 while being inverted by an inverter 49 to be added to the AND circuit 48. The output voltage of the integration circuit 45 is applied to the data input of the sample and hold circuit 50 of which the output is given to the data input of a sample and hold circuit 51. To the sampling control input of the circuit 51 is applied the output of the AND circuit 48.

Referring to FIG. 12, suppose the reference AC signal I sin $\omega t$ and the detection head unit output signal E have wave form as shown in FIG. 13(a), the outputs (b) to (h) of the circuit 43, 44, 46, 47, 45, 50 and 48, respectively, have wave form each as shown in FIGS. 13(b) through (h). As is obvious from FIG. 13, finally held by a circuit 51 is the integration circuit output voltage which corresponds to the detection head output signal E in phase $\omega t - \theta = 180°$. Because the integration circuit 45 is adapted to perform its integration operation when the reference AC signal I sin $\omega t$ is in phase $\omega t = 180°$, finally held by the circuit 51 is analog voltage V$\theta$ corresponding to the phase shift $\theta$. The circuit 14C comprises a positive peak hold circuit 52 and negative peak hold circut 53 which hold the positive peak voltage +MAX and negative peak voltage −MAX, respectively, of the output voltage of the integration circuit 45. The output voltages MAX and −MAX of the circuits 52 and 53 can be used as reference voltages for calculating the angle $\theta$ from the magnitude of the angle detection voltage signal V$\theta$, for the negative peak voltage −MAX corresponds to the phase $\theta = 0°$ and the positive peak voltage MAX corresponds to the phase $\theta = 360°$.

Figure 14A:
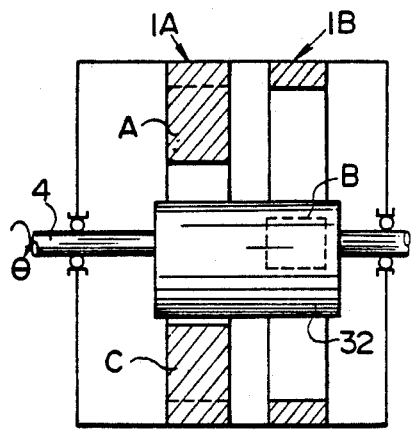
FIG. 14(a) is a side sectional view of the detection head unit according to the invention.
Figure 14B:
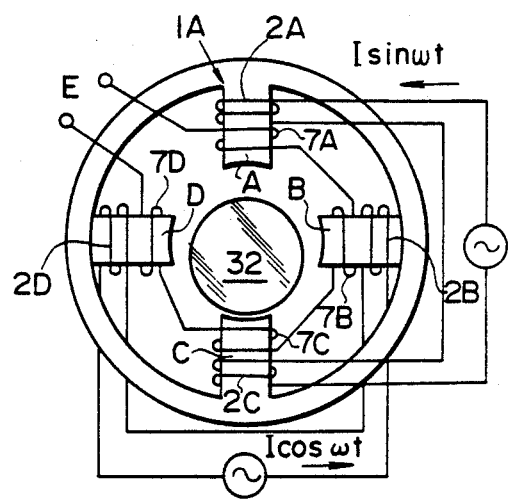
FIG. 14(b) is a front view of the circuit shown in FIG. 14(a)

According to the invention, one pole pair may be disposed on a concentric but different circumference from another, instead of on the same circumference, as illustrated in FIGS. 14(a) and (b). The stator consists of a stator 1A and stator 1B, one axially disposed with respect to another. The stator 1A has poles A and C radially opposite to one another with primary coils 2A and 2C on the respective poles connected in series so that the flux in one pole and the flux in the other may flow in opposite direction. The poles A and C are excited by a sine wave signal I sin$\omega$t. The stator B likewise has radially opposite poles B and D on which are wound primary coils 2B and 2D connected in series so that the flux in one pole and the flux in the other may flow in opposite directions. The poles B and D are excited by a cosine wave signal I cos $\omega t$. The stators 1A and 1B are disposed with respect to one another in such a manner that one pole pair A and C is at right angles to another pole pair B and D. The outputs of the secondary coils 7A to 7D are collected as a whole as in the case shown in FIG. 1. A rotor 32 is formed of a cylindrical core and eccentrically mounted on the shaft 4 similarly to the rotor 3 shown in FIG. 1.

Figure 15A:
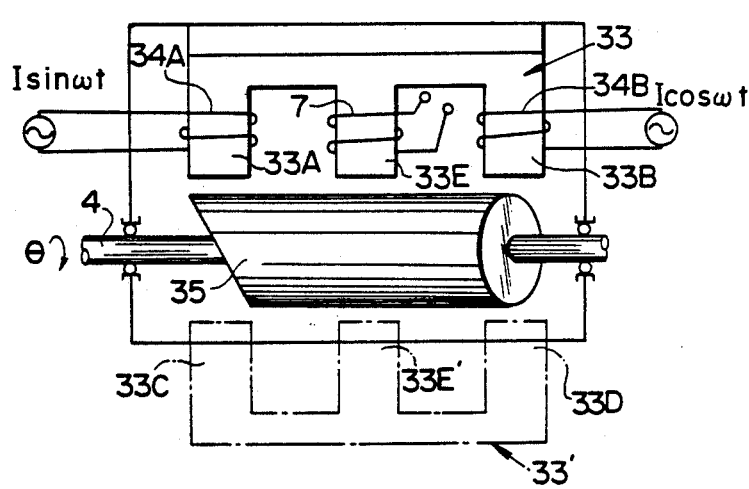
FIG. 15(a) is a side sectional view of still another embodiment of the detection head unit according to the invention.
Figure 15B:
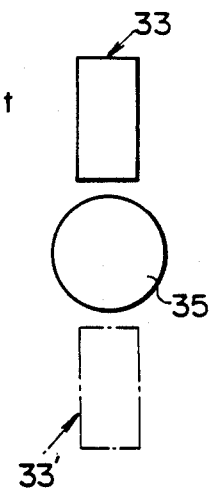
FIG. 15(b) is a front view of the embodiment shown in FIG. 15(a)

FIG. 15(a) illustrates another modification of the embodiment according to the invention comprising an E-shaped stator 33 which has on its opposite ends poles 33A and 33B with primary coils 34A and 34B wound thereon, respectively. The poles 33A and 33B are each excited by a sine wave signal I sin ωt and cosine wave signal I cos ωt. Intermediately located on the stator 33 is a pole 33E with a secondary coil 7 wound thereon. A rotor 35 is formed of a cylindrical core with both ends obliquely cut and coaxially mounted on the shaft 4. Both ends of the rotor 35 are not parallel to each other but one oblique end plane is 90° twisted with respect to the other. As the area with which the peripheral surface of the rotor 35 opposes the ends of the poles 33A and 33B varies according to the rotation angle θ of the rotor 35, it is possible to obtain the change in reluctance corresponding to the rotation angle θ. Said 90° twisted relation between both ends of the rotor 35 results in the change in reluctance of the pole 33A being 90° out of phase with that of the pole 33B. The same effect can be thus obtained as in the case where the pole 33A excited by a sine wave signal is disposed 90° out of phase with the pole 33B excited by a cosine wave signal. More specifically, it is possible to obtain, from the secondary coil 7 on the pole 33E, the AC signal which is shifted in phase according to the rotation angle θ of the rotor 35 as in the case of the embodiments shown in FIGS. 1, 3, 4 and 5. It is also feasible according to the invention as shown by a chain line in FIG. 15, to provide a like E-shaped stator 33' so as to oppose the stator 33 with the rotor 35 therebetween, while winding onthe poles 33A and 33C in a differential manner primary coils 33A and 33C excited by a sine wave signal and likewise winding on the poles 33B and 33D in a differential manner primary coils excited by a cosine wave signal. In that case, a sum of outputs of the secondary coils on the intermediate poles 33E and 33E' provided on the respective stators 33 and 33' is the AC signal K sin (ωt−θ) shifted in phase according to the rotation angle θ.

Reverting to Equation (7), the phase difference θ does not vary with time, meaning that the shaft 4 is at a standstill with a given rotation angle θ. When, therefore, the shaft 4 is rotating at a given angular velocity or angular acceleration, the phase difference θ (rotation angle) in Equation (7) is given as a function of time (t) as, $$E = K \sin\{\omega t + \theta(t)\} \quad (8)$$

The signs (±) for the phase difference function θ(t) indicate the direction of the phase difference (phase advance or phase lag) and correspond to he direction of rotation of the shaft 4. Description will now be given with this direction of phase difference limited to the direction of phase advance, i.e. +θ(t), for simplicity. The phase difference function θ(t) contains the element of the angular velocity or angular acceleration of the shaft 4.

When the shaft 4 is rotating at an angular velocity $\omega_M$, $$\frac{d}{dt}\theta(t) = \omega_M \quad (9)$$

is established and, as the integral of the angular velocity $\omega_M$ corresponds to the phase difference θ (t), Equation (8) can be rewritten as, $$E = K \sin\{(\omega + \omega_M)t + \theta_0\} \quad (10)$$

wherein $\theta_0$ indicates the initial phase.

When, on the other hand, the shaft 4 is rotating at an angular acceleration $\alpha_M$, $$\frac{d}{dt}\theta(t) = \alpha_M t \quad (11)$$

hence, $$\theta(t) = \int \alpha_M t \, dt = \frac{\alpha_M}{2} t^2 + \theta_0 \quad (12)$$

Equation (8), therefore, can be rewritten as, $$E = K \sin\left\{\left(\omega + \frac{\alpha_M}{2}t\right)t + \theta_0\right\} \quad (13)$$

As obvious from Equation (10) or (13), the phase difference of the rotation angle detection signal E which is outputted from the detection head unit 12 contains the element of the rotation angular velocity $\omega_M$ or rotation angular acceleration $\alpha_M$ so that the rotation speed or rotation acceleration can be found by analyzing the phase shift θ(more generally, θ(t)). It is therefore possible according to the invention to detect not only the rotation angle but the rotation speed as well as rotation acceleration. The buffer register 31 shown in FIGS. 6 or 9 samples the rotation angle data $D_\theta$ for every one cycle of the rotation angle detection signal E. When the shaft 4 is at a standstill with a given rotation angle θ, the rotation angle data $D_\theta$ retains a constant value corresponding to the rotation angle 8. When the shaft 4 is rotating at a velocity $\omega_M$ or acceleration $\alpha_M$, the rotation angle data $D_\theta$ varies at every sampling timing. It is therefore possible to find the angular velocity $\omega_M$ or angular acceleration $\alpha_M$ based on the change of the rotation angle data $D_\theta$.

Description will now be given as to how to more specifically find the angular velocity $\omega_M$ or angular acceleration $\alpha_M$. Shown in FIG. 16 by a chain line is an example of a rotation angle detection signal Es, namely, the rotation angle detection signal E obtained when the shaft 4 is rotating at an angular velocity $\omega_M$. The solid line represents the reference AC signal I sin ωt while the broken line shows a rotation angle detection signal Eo, namely, the rotation angle detection signal E obtained when the rotor is at a standstill with a given rotation angle θ. The initial phase of rotation of the signal Es is θ. The figure $t_o$ indicates one cycle of the rotation angle detection signal Eo and is identical to the cycle of the exciting AC signal I sin ωt on which the phase detection is based. The figure $t_s$ indicates one cycle of the rotation angle detection signal Es. It is noted from FIG. 16 that, while the shaft 4 is rotating, the frequency of the rotation angle detection signal E(i.e., Es) deviates from the reference frequency (ω). This is also obvious from Equation (10) and, more specifically, the frequency deviation corresponds to the angular velocity $\omega_M$. Letting the angular frequency of the rotation angle detection signal Es be $\omega_s$, Es can be expressed from Equation (10) as, $$E_s = K' \sin(\omega_s t + \theta_o) \quad (14)$$
$$= K' \sin\{(\omega + \omega_M)t + \theta_o\}$$

Figure 16:
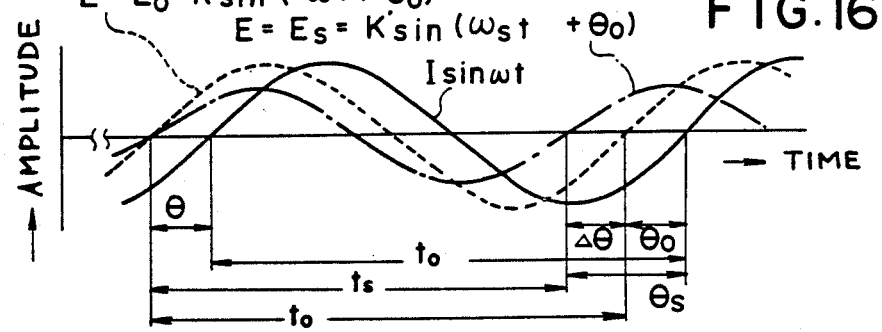
FIG. 16 is a diagram showing an example of frequency deviation of the output signals of the secondary coils in the embodiments of the detection head unit depending upon the angular velocity or angular acceleration of the rotating shaft.

In FIG. 16, $\Delta\theta$ is difference between the phase difference $\theta_o$, by which the reference signal $I \sin \omega t$ is, at a given time, different in relation to the rotation angle detection signal E (i.e., Es) on one hand, and a phase difference $\theta_s$ by which the reference signal $I \sin \omega t$ is, $t_s$ seconds later, different in relation to the rotation angle detection signal E on the other. When the shaft 4 is stationary, $\theta_o = \theta_s$ and $\Delta\theta = 0$ while when the shaft 4 is rotating, $\Delta\theta$ corresponds to the angular velocity $\omega_M$ of the shaft 4. More specifically, letting the period $t_o$ of the reference signal $I \sin \omega t$ be $2\pi$(radian) as is clear fro, FIG. 16, the phase value corresponding to the time $t_s$ is $$\int_0^{t_s} \omega \, dt$$

and $\Delta\theta$ is expressed as, $$\Delta\theta = 2\pi - \int_0^{t_s} \omega \, dt \quad (15)$$

As is known from Equation (14), $$\omega_s = \omega + \omega_M \quad (16)$$
$$\omega = \omega_s - \omega_M$$

Substituting these into Equation (15).

$$\Delta\theta = 2\pi - \int_0^{t_s} \omega_s \, dt + \int_0^{t_s} \omega_M \, dt \quad (17)$$
$$= \int_0^{t_s} \omega_M \, dt$$

is obtained. Since $$\omega_s = 2\pi \frac{1}{t_s}, \quad \int_0^{t_s} \omega_s \, dt = 2\pi.$$

As is obvious from Equation (17), $\Delta\theta$ is a function of the angular velocity $\omega_M$.

Solving Equation (17) for $\omega_M$, $$\Delta\theta = \omega_M \cdot t_s \quad (18)$$
$$\omega_M = \frac{\Delta\theta}{t_s}$$

is obtained. The angular velocity $\omega_M$ can be found on the basis of $\Delta\theta$ and $t_s$. Specifically, $t_s$ is obtained by counting one cycle of the rotation detection signal E(i.e., Es) by the clock pulse CP. Letting the count value corresponding to $t_s$ be $n_s$ and letting one cycle of the clock pulse CP be $\phi$(sec.), $$t_s = n_s \cdot \phi \quad (19)$$

The value $\Delta\theta$ may also be obtained on the basis of said count $n_s$. Letting the number of counts of the clock pulse CP corresponding to cne cycle $t_o$ of the reference signal $I \sin \omega t$ be $n_o$, the angular frequency $\omega$ is expressed as $$\omega = 2\pi \frac{1}{t_o} = 2\pi \frac{I}{n_o \cdot \phi} \quad (20)$$

Substituting Equation (20) into Equation (15) and solving the integration term, $$\Delta\theta = 2\pi - \frac{2\pi \cdot n_s}{n_o} = \frac{2\pi \cdot n_s}{n_o} - \frac{2\pi \cdot n_s}{n_o} \quad (21)$$
$$= \frac{2\pi}{n_o}(n_o - n_s)$$

Substituting Equations (21) and (19) into Equation (18), $$\omega_M = \frac{2\pi}{n_o \cdot \phi}\left(\frac{n_o - n_s}{n_s}\right) \quad (22)$$

is obtained, where $n_o$ is a constant corresponding to a frequency division ratio 1/2M and $n_o = 2M$. The period $\phi$ of the clock pulse CP is a known constant. As is obvious from Equation (22), therefore, the angular velocity $\omega_M$ can be found by counting one cycle of the rotation angle detection signal E to obtain the count $n_s$, and then merely solving Equation (22). Since $\omega_M = \omega_s - \omega$ from Equation (16), the same solution may be alternatively obtained by solving $$\omega_M = \omega_s - \omega$$
$$= 2\pi \frac{1}{t_s} - 2\pi \frac{1}{t_o}$$
$$= 2\pi\left(\frac{1}{n_s \cdot \phi} - \frac{1}{n_o \cdot \phi}\right)$$

Between the angular acceleration $\alpha_M$ and angylar velocity $\omega_M$ can be established the following relation, $$\alpha_M = \frac{d}{dt}\omega_M \approx \frac{\Delta\omega_M}{\Delta t} \quad (23)$$

wherein $\Delta\omega_M$ is the amount of change in the angular velocity $\omega_M$ during time change $\Delta t$. Letting the angular velocity at a time $t_1$ be $\omega_{M1}$ and letting the angular velocity at a time $t_2$ which is $t_s$ seconds later than $t_1$ be $\omega_{M2}$, $$\Delta t = t_s, \quad \Delta\omega_M = \omega_{M2} - \omega_{M1}$$

and since $t_s = n_s \cdot \phi$ from Equation (19), Equation (23) can be rewritten as, $$\alpha_M = \frac{\omega_{M2} - \omega_{M1}}{t_s} \quad (24)$$
$$= \frac{\omega_{M2} - \omega_{M1}}{n_s \cdot \phi}$$

The angular acceleration $\alpha_M$, therefore, can be calculated by detecting the angular velocity $\omega_M$ for every one cycle $t_s$ of the rotation angle detection signal E(i.e., Es) to find the difference between the angular velocity $\omega_{M2}$ and the angular velocity $\omega_{M1}$, and dividing that difference by the product of the count $n_s$ and the period $\phi$ of the clock pulse CP.

Description will now be made, with reference to FIGS. 17 through 23, of an example of a circuit whereby to obtain velocities and accelerations by performing the above operations.

Figure 17:
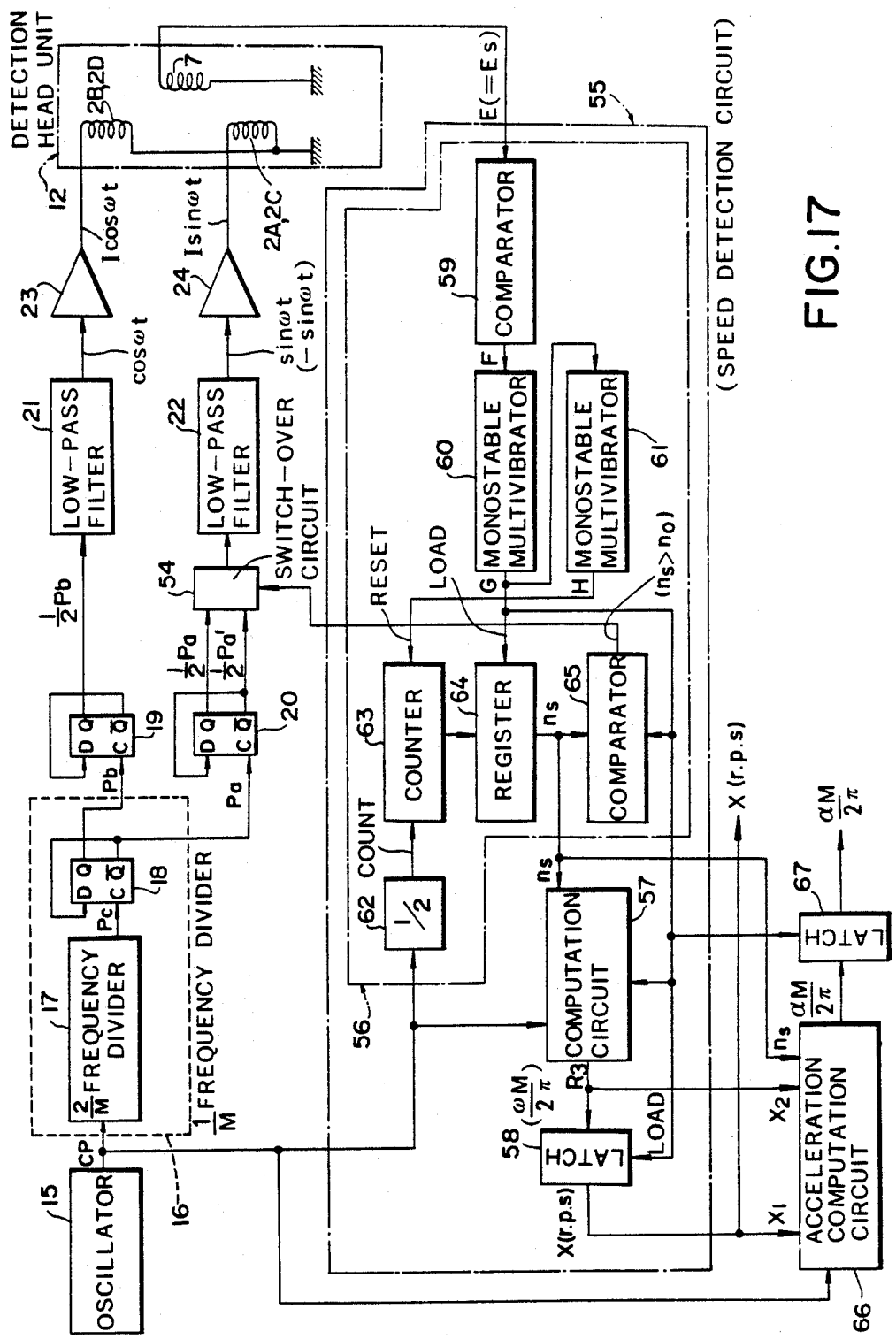
FIG. 17 is a block diagram showing an example of a circuit for detecting the rotation speed and rotation acceleration in response to the output signal from the detecting head unit.
Figure 18:
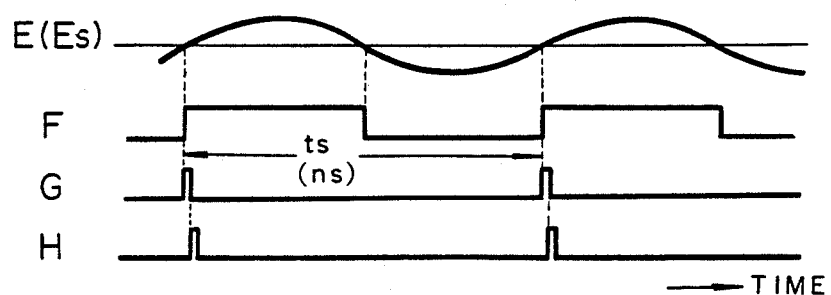
FIG. 18 is a time chart showing examples of output waveforms in some portions of the circuit of FIG. 17.

In FIG. 17, circuits 15 through 24 provided to supply the primary coils 2A, 2C, 2B and 2D of the detection head unit 12 with the sine wave signal I sin $\omega_t$ and cosine wave signal I cos $\omega_t$ are each identical to the circuits with the same reference numerals forming the circuit 13 shown in FIG. 6 except that in FIG. 17, the output signals $\frac{1}{2}$ Pa and $\frac{1}{2}$ Pa' of the output terminal Q and its inverted output terminal $\overline{Q}$ of the flip-flop circuit 20 are applied to a circuit 54 which selects and applies one of said output signals to the low-pass filter 22 so that, as will be described later, the exciting signals may be switched over in phase by 180° according to the direction of rotation.

As earlier mentioned, from the secondary coil 7 of the detection head unit is obtained the AC signal E=ES=K'sin $(\omega_s t + \theta_o)$ deviated in frequency by $\omega_M$ corresponding to the rotation speed. While the direction of the frequency deviation $\omega_M$ with respect to the reference frequency $\omega$ depends on the rotational direction of the shaft 4, description will now be made on the supposition that the shaft 4 is rotating in a positive direction, namely in such a direction that the frequency $\omega_s$ is higher than the reference frequency $\omega$. Said positive direction will be hereinafter referred to as clockwise direction.

The speed detection circuit 55 is provided to obtain the rotation speed based on the output signal E (Es) of the detection head in t 12 and comprises a period computation circuit 56, computation circuit 57 and latch circuit 58. The period computation circuit 56 is provided to obtain the period $t_s$ of the output signal E(Es) of the detection head unit 12 and outputs the count $n_s$ corresponding to $t_s$ by counting one cycle of the signal Es against the clock pulse CP. The output signal E (Es) is inputted to a comparator 59 which outputs "1" or "0" depending on the polarity of the input signal E. A monostable multivibrator 60 outputs one shot of pulse G(lasting, for example, for the period of about 100 nano seconds) at the rise of the output signal F. A monostable multivibrator 61 outputs one shot of pulse H at the fall of the pulse G(see FIG. 18). The pulse G, therefore, is generated keeping pace with the period $t_s$ of the output signal E(Es) while the pulse H is produced a little behind the pulse G. A frequency division circuit 62 frequency divides the clock pulse CP by 2 and a counter 63 counts the output of the circuit 62. To the reset input of the counter 63 is supplied the pulse H. The count output of the counter 63 is applied to a register 64. To the load control input of the register 64 is supplied the pulse G. Therefore, the counter 63 is reset immediately after a count is loaded to the register 64 by the pulse G. Because the counter 63 is reset by the pulse H every one cycle $t_s$ of the output E(Es), the counter 63 retains the count $n_s$ corresponding to $t_s$ at a timing of the pulse G immediately before the pulse H. Said value $n_s$ is memorized by the register 64. The computation circuit 57 performs the operation of Equation (22). As $2\pi$, $n_o, \phi$ are known constants, the operation can be performed, with the count $n_s$ memorized by the register 64, in the following order:

1    $n_o - n_s \ldots R_1$

2    $\dfrac{R_1}{n_s} \ldots R_2$

3    $\dfrac{2\pi}{n_o \cdot \phi} \times R_2 \ldots R_3$ wherein $R_1$, $R_2$ and $R_3$ are the results of the above respective steps of calculations. Since in this example, the counter 63 counts frequency-halved clock pulse CP, the Figure $\phi$ in the above formula indicates double the period of the clock pulse CP. In other words, the clock pulse CP has a period $\phi/2$ in this example. The other constants are specified as follows. The period $t_o$ of the reference AC signal I sin $\omega t$, which is obtained by frequency dividing the clock pulse CP by 2M, is $\phi M$ namely 2M times the cycle of the clock pulse CP. The count $n_o$ corresponding to the period $t_o$ is calculated by $$n_o = \frac{t_o}{\phi} = M,$$

If the frequency division factor M of the frequency division circuit 16 is 9766, then $n_O = 9766$. If the frequency of the clock pulse CP is 3.2M $H_z$, $$\phi = \frac{1}{1600000}.$$

The number of revolutions per second (r.p.m.) can be obtained by dividing by two the angular velocity $\omega_M$ calculated by Equation (22). In general the rotation speed is expressed by the number of revolutions rather than by the angular velocity $\omega_M$. In the computation circuit 57, therefore $$\frac{1}{n_o \cdot \phi}$$

obtained by dividing the coefficient by $2\pi$ may preferably be used in the multiplication in the operational step (3) therefore is modified as follows:

3    $\dfrac{1}{n_o \cdot \phi} \times R_2 \ldots R_3$

The result $$R_3 \left( \frac{\omega M}{2\pi} \right)$$

thus obtained, which indicates the rotation speed of the shaft 4, is latched by the latch circuit 58. Data is loaded to the latch circuit 58 at a timing of the pulse G so that data X, indicating the rotation speed and retained in the latch circuit 58, is rewritten every cycle $t_s$ of the output signal E. The computation circuit 57 has the clock pulse CP and pulse G applied thereto to control the operation timing. The calculation step (3) of course be performed as such to obtain the angular velocity $\omega_M$.

A digital comparator 65 is provided to detect the rotational direction of the shaft 4 by comparing the count $n_s$ outputted from the register 64 with the reference count $n_o$. The comparator 65 outputs "1" at a timing of the pulse G when $n_s > n_o$ and "0" in other cases. The output of the comparator 65 is applied to the switch-over circuit 54 which switches the pulse it selects from the pulse ½ Pa to ½ Pa, or vice versa every time "1" is given from the comparator 65.

Suppose the switch-over circuit 54 is now selecting the pulse ½ Pa and the rotational direction is clockwise while the frequency $\omega_s$ of the output E (Es) is higher than the reference frequency ($\omega_s > \omega$). Then $n_s < n_o$ and the comparator 65 outputs "0" so that the circuit 54 is still selecting the pulse ½ Pa. When, in this state, the rotational direction changes to become counterclockwise, the angular velocity $\omega_M$ assumes a negative value $-\omega_M$ and $\omega_s < \omega$ while $n_s > n_o$. The output of the comparator, therefore, changes to "1" with the result that the pulse selected by the switch-over circuit 54 is switched from the pulse ½ Pa to pulse ½ Pa' meaning that $i_a$ in Equation (6) changes to $-I \sin \omega t$ as the output of the filter 22 corresponding to the pulse ½ Pa' is $-\sin \omega t$. Substitution of $-I \sin \omega t$ for $i_a$ in Equation (6) will show that the polarity of the output signal E is only reversed while, on the other hand, the direction of the phase shift $\theta$ remains the same as a result of change in the rotational direction of the shaft 4. In other words, while change in the rotational direction results in inversion of the direction of the phase difference $\theta$ of the output signal E from positive to negative or vice versa in case the direction of the phase difference of the primary-windings-exciting signals $i_a \cdot i_b$ remain the same, it is possible to keep the phase difference $\theta$ of the output signal E in the same direction at all times by reversing the phase of the primary-winding-exciting signals $i_a$, $i_b$ when the rotational direction is inversed. The relation $n_s < n_o$ is thus established with respect to the counterclockwise rotation by switching the exciting signals and the output of the comparator 65, therefore, changes to "0" immediately. Upon inversion of the rotational direction from counterclockwise to clockwise while the pulse ½ Pa' is being selected by the switch-over circuit 54, the relation $n_s > n_o$ is established and the comparator 65 outputs "1" as mentioned above with the result that the switch-over circuit 54 is switched to select the pulse ½ Pa. Therefore, the relation $n_s < n_o$ is immediately set up for the clockwise rotation.

The comparator 65 and switch-over circuit 54 thus serve to realize the relation $n_s < n_o$. As a result, the computation circuit 57 can be simple in composition (because $n_o - n_s$ is always positive). Moreover, the rotation speed data X outputted from the latch circuit 58 can be processed easily because such an extra circuit is dispensed with as is required to obtain the absolute value of the rotation speed data X which is outputted from the latch circuit 58 either as a positive or negative value depending on the rotational direction where the comparator 65 and switch-over circuit 54 are not provided. The present invention, however, may of course be worked without the comparator 65 and switch-over circuit 54. The acceleration computation circuit 66 performs the operation of Equation (24) on the basis of the velocity data obtained by the speed detection circuit 55 thereby to find the acceleration $\alpha_M$. To the acceleration computation circuit 66 is applied data latched in the latch circuit 58 as data $X_1$ indicating the preceding rotation speed; the result $R_3$ of the above calculation step (3)' outputted from the computation circuit 57 as data $X_2$ indicating the present rotation speed; and the count $n_s$ corresponding to the period $t_s$ of the signal E memorized by the register 64 as data indicating the time elapsed between the preceding detection and the present detection. On the basis of those data, $$\frac{X_2 - X_1}{n_s \cdot \phi} \tag{25}$$

is calculated to find the rotation speed. If $$X_2 = \frac{\omega M2}{2\pi} \text{ and } X_1 = \frac{\omega M1}{2\pi},$$

the above formula reduces to $$\frac{\omega M2 - \omega M1}{2\pi \cdot n_s \cdot \phi} = \frac{\alpha M}{2}$$

providing to be a similar computation to that carried out in Equation (24) in that from Equation (24) is obtained the angular acceleration $\alpha_M$ while by calculation of Formula (25) is directly found the rate of change of rotation speed per second or acceleration $$\frac{\alpha M}{2\pi}.$$

If $X_1$, $X_2$ indicate the angular velocities $\omega_{M1}$, $\omega_{M2}$, respectively, the angular acceleration $\alpha_M$ is of course obtained as shown in Equation (24) in the computation circuit 66. Data indicating the acceleration $$\frac{\alpha M}{2\pi}$$

obtained by the computation circuit 66 is applied to the latch circuit 67 at a timing of the pulse G. From the latch circuit 67 is thus outputted data indicating the rotation acceleration. The data is rewritten every cycle of the output signal E.

While in the example shown in FIG. 17, the rotation speed is calculated on the basis of the periods $t_o$, $t_s$ ($n_o$, $n_s$), the rotation angular velocity $\omega_M$ may be obtained by directly measuring the frequency $\omega_s$ of the output signal E(Es) as shown in FIG. 19. The circuitry shown in FIG. 19 comprises circuits 18 through 24 each performing the same function as the circuit likewise numbered in FIG. 17. Those circuits produce a sine wave signal I sin$\omega$t and a cosine wave signal I cos $\omega$t on the basis of oscillatory output from an oscillation circuit 68. The output signal E (Es) of the detection head unit 12 is to a comparator 69 which, performing the same function as the comparator 59 shown in FIG. 17, outputs a pulse signal F having the same frequency as the output signal E. A frequency measurement circuit 70 measures the frequency $\omega_s$ of the pulse signal F, based on which it outputs data $X_2$ indicating the present rotation angular velocity $\omega_M$. That is, since $\omega_M = \omega_s - \omega$ from Equation (13), $\omega_M$ can be computed by measuring the frequency $\omega_s$ of the signal F(i.e., output signal E).

FIG. 20 shows an example of the frequency measurement circuit 70 wherein a frequency/voltage converter 70A is employed to output an analog voltage V ($\omega_M$) indicating the rotation angular velocity $\omega_M$. The rotation speed can be obtained very easily with this example as the output velocity V ($\omega_M$) corresponding to the signal F is put in a proportional relation to the difference $\omega_s - \omega$ between the input frequency $\omega_s$ and offset frequency $\omega$, namely to the rotation speed $\omega_M$ by presetting the offset frequency of the frequency/voltage converter 70A at the reference frequency ω.

FIG. 21 shows another example of the frequency measurement circuit 70 where a frequency counter 70B is employed to output digital data C($\omega_M$) indicating the rotation speed The data C($\omega_s$) indicating the counted frequency $\omega_s$ and data C(ω) indicating the reference frequency ω are inputted to a subtractor 70C to obtain velocity data C($\omega_M$).

Direct measurement of frequency as illustrated in FIG. 19 is advantageous when a detection head unit of high resolution type to be described later is employed in that frequency measurement accuracy is enhanced as the frequency difference corresponding to the rotation angular velocity is greatly enlarged by a detection head unit of that type. Data outputted from the frequency measurement circuit 70 is held by a memory circuit 71 at a suitable timing. To the acceleration computation circuit 66 are applied the output of the memory circuit 71 as preceding velocity data X and the output of the frequency measurement circuit 70 as present velocity data $X_2$ to obtain the acceleration $a_M$ on the basis of the change ($X_2 - X_1$)

When the velocity $\omega_M$ and acceleration $\Omega_M$ are to be obtained in analog, the frequency measurement circuit 70 may be embodied by the frequency/voltage converter 70A as shown in FIG. 20. In general, however, frequency/voltage converters have a relatively large time constant and as such are limited in response to change in velocity.

Figure 22:
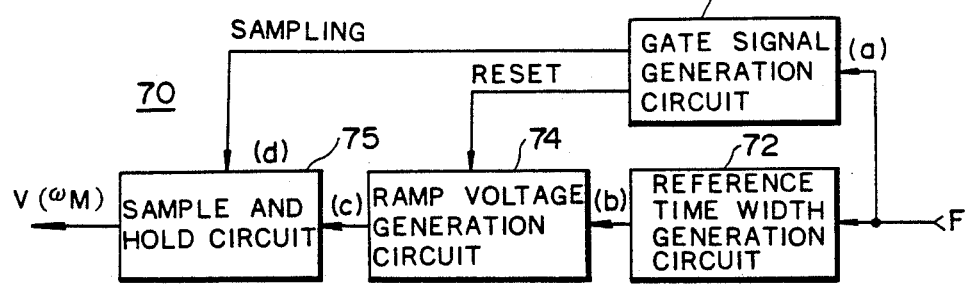
Figure 23:
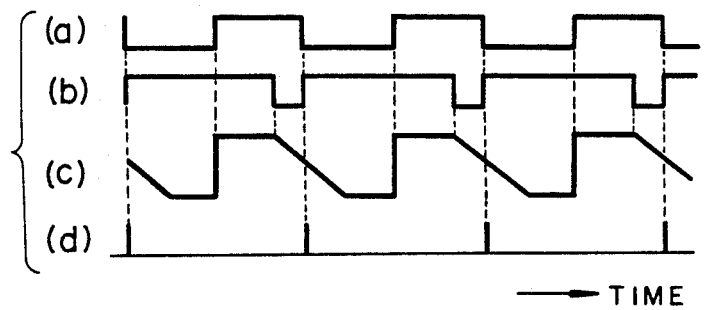
FIG. 23 is a time chart showing examples of output waveforms in some portions of the circuit in FIG. 22.

For improved response to change in velocity, a cycle/voltage converter as shown in FIG. 22 may be used instead. The signal F from the comparator 69 is applied to a reference time width generation circuit 72 as well as to gate signal generation circuit 73. The waveform of the signal F is shown in FIG. 23(a). The reference time width generation circuit 72 is triggered by the fall of the signal F and generates pulses with a reference time width $t_o$, as shown in FIG. 23(b), which corresponds to one cycle of the reference AC signal I sinωt. A ramp voltage generation circuit 74 produces ramp voltage having a certain slope each pulse starting at the fall of the reference time width generation pulse, as shown in FIG. 23(c). The ramp voltage is applied to a sample and hold circuit 75. The gate signal generation circuit 73 outputs a sampling pulse as shown in FIG. 23(d) corresponding to the fall of the signal F. Said sampling pulse is given to the sampling control input of the sample and hold circuit 75. A reset pulse generated at the rise of the signal F is given from the gate signal generation circuit 73 to the ramp voltage generation circuit 74 to reset the ramp voltage as shown in FIG. 23(c).

As mentioned above, the cycle of the signal F is identical to that of the output signal E of the detection head unit 12 (FIG. 19) and changes according to the turning speed. When the turning speed is 0 (stationary), one cycle of the signal F is identical to the reference time width $t_o$. Since each pulse of the ramp voltage of the ramp voltage generation circuit 74 starts at the fall of the reference time width $t_o$, DC voltage V ($\omega_M$) corresponding to the rotation speed $\omega_M$ can be obtained by sample-and-holding the ramp voltage by the sample and hold circuit 75 at the end of every cycle of the signal F. A cycle/voltage conversion circuit as mentioned above, whereby voltage V($\omega_M$) corresponding to the rotation speed is obtained every cycle, is rich in response and detects an even extremely small difference in cycle with high resolution.

Coupling the circuitry illustrated in FIGS. 9, 10 or 12 with the circuitry illustrated in FIGS. 17 or 19 makes it possible, with only one detection head unit 12 provided, to detect the rotation angle θ and the rotation speed $\omega_M$ namely, number of revolutions X (r. p. s.) as well as the rotation acceleratio $a_M$ namely, rate of change in revolution number $$\frac{a_M}{2\pi},$$

all together.

Description will now be given of an example of the detection head unit according to the invention which is improved over the above described examples of the detection head unit by providing the poles of the stator and the rotor with teeth.

Figure 24A:
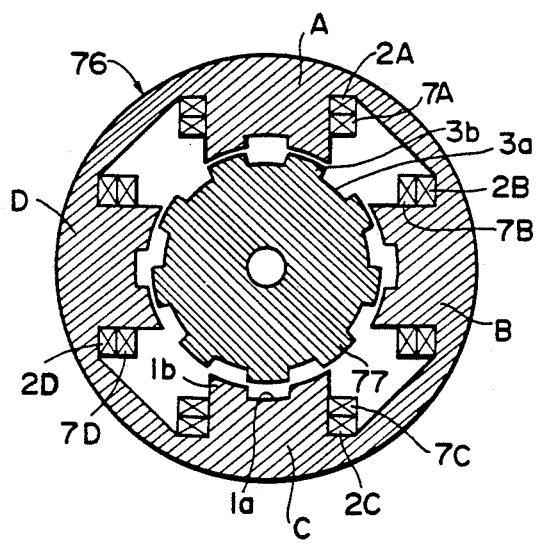
FIG. 24(a) is a radial sectional view of an embodiment of a high resolution type detection head unit according to the invention.
Figure 24B:
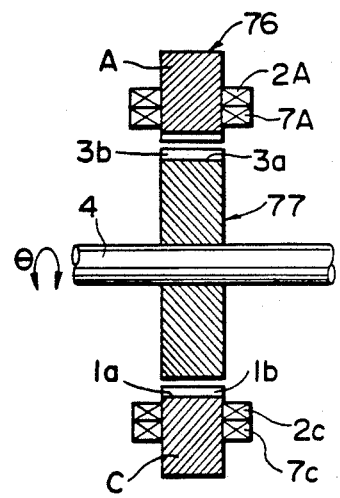
FIG. 24 (b) is an axial sectional view of the embodiment shown in FIG. 24(a)

In the detection head unit shown in FIGS. 24(a) and 24(b), a stator 76, like the stator 1 in FIG. 1, has four poles A, B, C and D at an interval of 90°. Primary coils 2A–20 and secondary coils 7A–7D are wound on the respective poles A, B, C and D.

Figure 25:
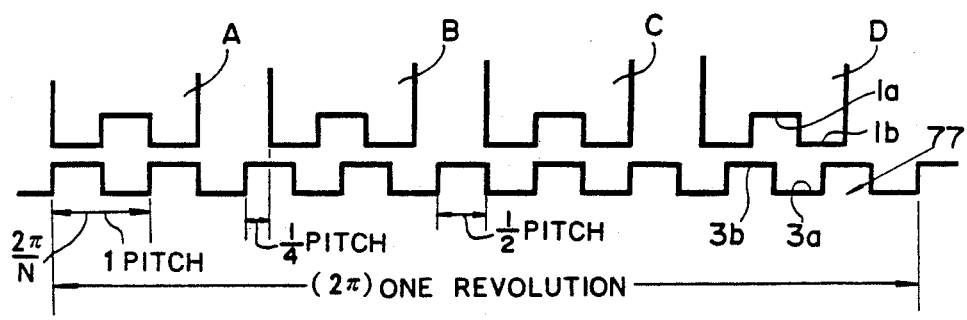
FIG. 25 is a view for illustrating relationship between teeth formed in the rotor and teeth formed in the stators shown in FIGS. 24(a) and 24(b)

The rotor 77 is of a gear wheel configuration having a plurality of teeth provided at an equal pitch about the periphery thereof. Each of the teeth of the rotor 77 consists of a recess 3a and a projection 3b. Likewise, the poles A, B, C and D of the stator 76 also have, at the end portions thereof opposing the rotor 77, teeth consisting of a recess 1a and a projection 1b with a pitch properly corresponding to the pitch of the teeth of the rotor 77. The teeth (3a, 3b) of the rotor 77 correspond to the teeth (1a, 1b) of the poles A-D in such a manner that a mechanical phase difference corresponding to ½ pitch is produced between the poles which constitute a pair (i.e., A and C, or B and D). By this arrangement, permeance between the pole A (or B) and the rotor 77 and permeance between the pole C (or D) and the rotor 77 vary in a differential manner at a cycle equivalent to 1 pitch. Besides, a mechanical phase difference which is less than ½ pitch is produced between the poles of each pole pair (i.e., A and C, or B and D). Since the present embodiment has two pairs of the poles (A and C and B and D), the device is designed so that a mecanical phase difference of ¼ pitch which is half of ½ pitch is produced. Correspondence between the teeth (3a, 3b) of the rotor 77 and the teeth (1a, 1b) of the poles A-D of the stator 76 is shown in FIG. 25. In FIG. 25, the pitch number of the teeth of the rotor 77 is 9 pitches per one revolution. It should, however, be noted that this is only an example.

Since the position of the teeth (1a, 1b) of the pole A of the pole pair A, C relative to the teeth (3a, 3b) of the rotor 77 is out of phase by ½ pitch to the position of the teeth (1a, 1b) of the pole C relative to the teeth (3a, 3b), of the rotor 77, permeance in the gap between the end portion (teeth portion) of the pole C and the teeth portion of the rotor 77 is minimum when permeance in the gap between the end portion of the pole A and the teeth portion of the rotor 77 is maximum. At a rotation angle shifted by ¼ pitch from this angle, permeance of the pole A is equal to that of the pole C whereas at a rotation angle shifted by ½ pitch, permeance of the pole A is minimum and that of the pole C is maximum. Thus, permeance of the pole A changes in an opposite direction (i.e., differentially) to permeance of the pole C at a rate of 1 cycle per 1 pitch. The same is the case with the other pole pair B and D. Since the pole pair B, D is provided in a position shifted by 90° from the pole pair A, C change in permeance observed in the pole pair B, D takes place at a rotation angle which is shifted by ¼ pitch from the pole pair A, C.

Permeances $P_A'$, $P_B'$, $P_C'$, and $P_D'$ between the stator poles A, B, C, and D and the rotor 77 change with the rotation angle $\theta$ as expressed by the following equations:

$$P_A' = P_0 + P_1 \sin N\theta \qquad (26)$$
$$P_B' = P_0 - P_1 \cos N\theta$$
$$P_C' = P_0 - P_1 \sin N\theta$$
$$P_D' = P_0 + P_1 \cos N\theta$$

In these equations, $P_0$ and $P_1$ are constants determined in the same manner as in the equation (1). As will be apparent from comparison of the equation (1) with the equation (26), the change in permeances $P_A$ throu $P_D$ occurs cyclically for each rotation of the rotor (i.e., 1 cycle per 1 rotation of the rotor) in the toothless detection head as shown in FIGS. 1(a), 1(b), 3(a), 3(b), 4(a), 4(b), 5(a), 5(b), 14(a), 14(b), 15(a) and 15(b) whereas change in permeance $P_A'$ through $P_D'$ occurs cyclically for each $2\pi/N$ radian (i.e., 1 cycle per $2\pi/N$ radian) corresponding to 1 pitch of the rotor teeth (3a, 3b) in the toothed detection head. Accordingly, in the toothed detection head, the phase difference corresponding to the rotation angle $\theta$ is enlarged to N times and realized as $N\theta$ in the output signal E. By exciting the poles A and C of the stator 76 shown in FIG. 24 by means of the sine wave signal I sin $\omega$t and the poles B and D by means of the cosine wave signal I cos $\omega$t in the same manner as in the embodiment shown in FIG. 1, the sum output signal E of the secondary coils 7A-7D is expressed as follows for the same reason as in the equations (1) and (7):

$$E = K \sin(\omega t - N\theta) \qquad (27)$$

As circuits for detecting the phase difference $N\theta$ in response to this output signal E, the same circuits as those shown in FIGS. 6, 9, 10 and 12 may effectively be employed. If, for example, the detection head shown in FIGS. 1(a) and 1(b) is employed as the detection head 12 in FIG. 6, 1 count of the counter 30 of modulo M corresponds to $\pi/M$ radian whereas if the detection head shown in FIGS. 24(a) and 24(b) is employed, 1 count corresponds to $\pi/NM$ radian resulting in increase in resolution of detection by N times Accordingly, the high resolution type detection head unit shown in FIGS. 24(a) and 24(b) is suitable for detecting a small rotation angle with accuracy. It is also possible to employ the high resolution type detection head unit shown in FIGS. 24(a) and 24(b) as the detection head unit 12 of FIGS. 17 and 19. In this case, the rotation speed $\omega M$ and the rotation acceleration 2M may be detected with a high resolution.

Figure 26:
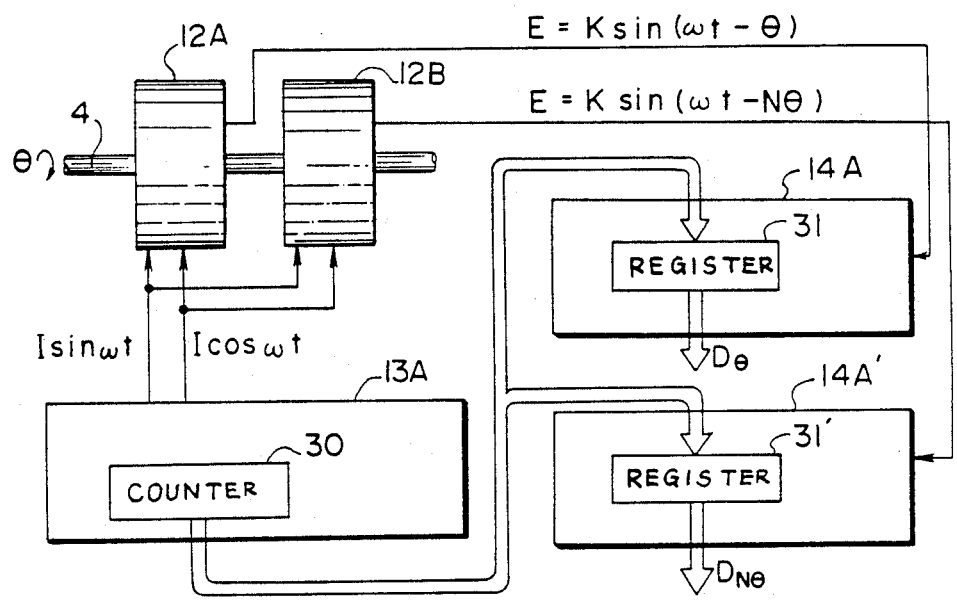
FIG. 26 is a side elevation and block diagram showing schematically an example of a combination of the high resolution type detection head unit and a detection head unit for detecting an absolute rotation angle for each tooth provided on the same shaft.

Despite the high resolution, the detection head unit shown in FIGS. 24(a) and 24(b) can only detect a relative rotation angle within 1 pitch (i.e., $2\pi/N$ radian) of the teeth (3a, 3b). If necessary, therefore, an arrangement may be made so that a coarse absolute rotation angle may be detected for each tooth of the rotor 77 by suitable means and an absolute value of the rotation angle $\theta$ of the rotor 77 may be obtained by combining this coarse absolute rotation angle for each tooth with the above described fine relative rotation angle. FIG. 26 schematically shows an example of such combination.

Figure 27:
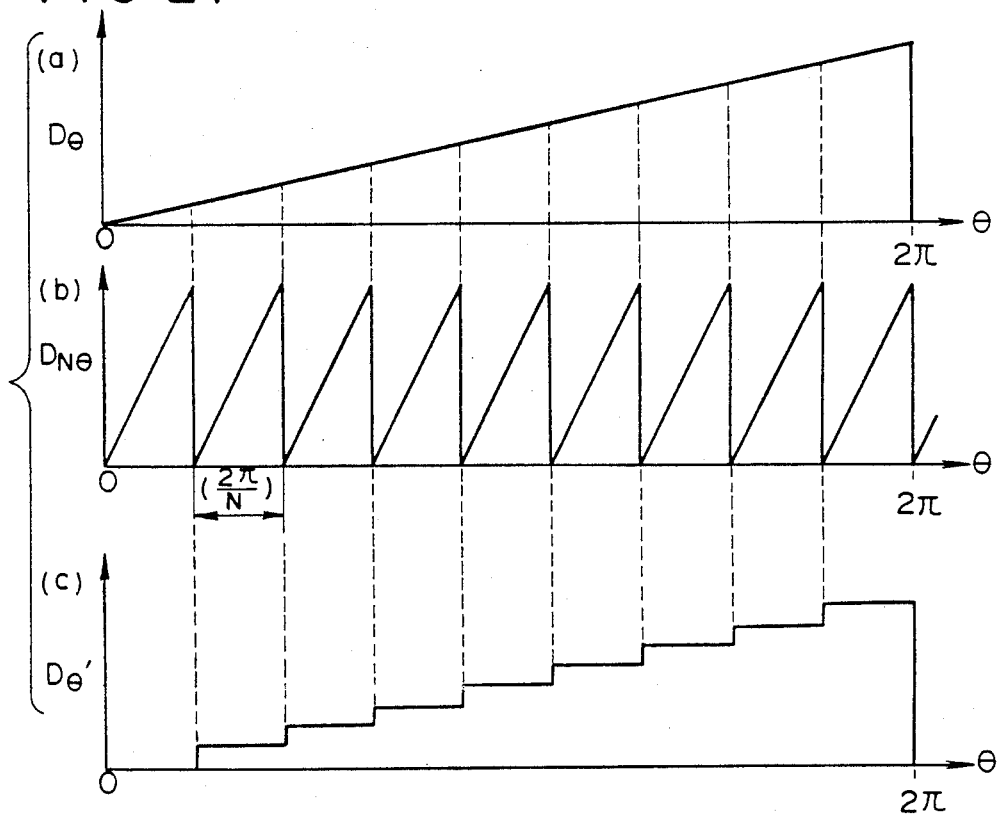
FIG. 27 is a graphical diagram showing absolute angle detection data and high resolution relative angle detection data obtainable from the device shown in FIG. 26 with a vertical axis representing detected values and a horizontal axis representing the angle.

In FIG. 26, a shaft 4 which is provided with the rotation angle $\theta$ has two detection head units 12A and 12B. The detection head unit 12B consists, as shown in FIGS. 24(a) and 24(b), of a stator 76 having teeth 1a, 1b and a rotor 77 having teeth 3a, 3b and detects a relative rotation angle for each tooth with a high resolution. The other detection head unit 12A is provided for detecting a coarse absolute rotation angle for each tooth. The toothless rotation heads as shown in FIGS. 1(a), 1(b), 2(a)–5(b), 14(a)–15(b) may be employed. As the circuit 13A for generating the reference AC signal I sin$\omega$t and I cos$\omega$t and the circuit 14A for detecting the phase difference $\theta$ in the secondary coil output signal E in the detection head unit 12A, circuits of the same reference characters shown in FIG. 9 may be utilized. Similarly, the circuit 14A' detecting the phase difference $N\theta$ in the secondary coil output signal E in the high resolution type detection head unit 12B may be constructed in the same manner as in the above described circuit 14A. The circuit is not limited to that of FIG. 9 but the one shown in FIGS. 6, 10 or 12 or a circuit of other construction may be employed. A register 31 in the circuit 14A latches data $D\theta$ resulting from relatively coarse detection of the absolute rotation angle. A register 31' in the circuit 14A' latches data $D_{N\theta}$ resulting from high resolution detection of the relative rotation angle within 1 pitch of the rotor teeth. A counter 30 and a register 31 (31') shown in FIG. 26 perform the same function as those designated by the same reference numerals in FIG. 9. Detailed illustration of circuit portions of the circuits 13A, 14A and 14A' which will be apparent from FIG. 9 is omitted. The circuit 13A which generates the reference AC signals I sin $\omega$t and I cos $\omega$t is used commonly for the detection head units 12A and 12B. Relation between the phase difference detection data $D\theta$ and $D_{N\theta}$ obtained by the circuits 14A and 14A' and the rotation angle $\theta$ is shown in portions (a) and (b) in FIG. 27. As will be appreciated from FIG. 27, the absolute rotation angle can be detected with a high resolution by combination of phase difference detection data $V\theta$ and $V_{N\theta}$ detected by the detection head units 12A and 12B. For the detection head unit 12A, a device capable of producing detection data $D\theta$, as shown in portion (c) of FIG. 27 which has stepped portions corresponding to positions of the respective teeth may be employed. This device may be constructed, for example, of combination of switches, sensors and a processing circuit.

Figure 28:
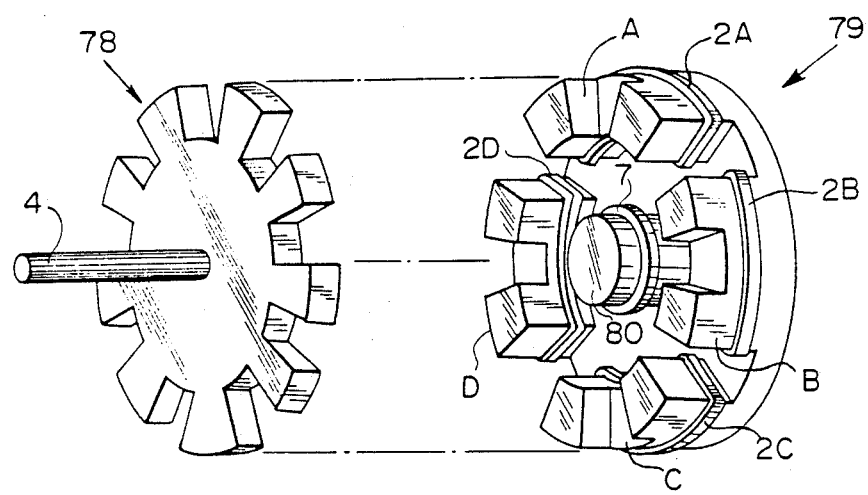
FIG. 28 is an exploded perspective view of another embodiment of the high resolution type detection head unit according to the invention.

The configurations of the stator 76 and the rotor 77 are not limited to those shown in FIGS. 24(a) and 24(b) but modification can be made within the scope of the invention. For example, the direction of flux passing through the gap between the stator 76 and the rotor 77 which is radial in FIGS. 24(a) and 24(b) may be changed to the axial direction of the shaft as shown in FIG. 28. In FIG. 28, a rotor 78 is formed with teeth with a certain pitch as in the rotor 77 shown in FIG. 24(a). A stator 79 has four poles A, B, C and D projecting in the axial direction and being provided at an equal interval on the periphery. The end portion of each pole has teeth opposing the teeth of the rotor 78. The poles A–D have primary coils 2A–2D wound thereon An axially projecting pole 80 is also provided in the central portion of the stator 79 on which pole 80 is wound a secondary coil 7.

Figure 29A:
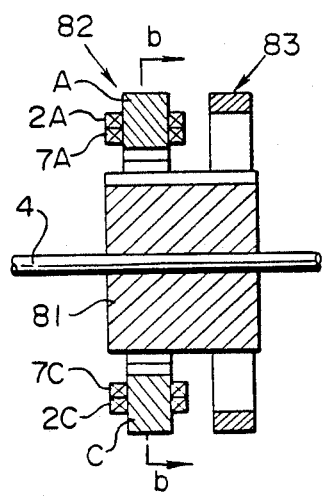
FIG. 29(a) is an axial sectional view showing another embodiment of the high resolution type detection head unit.
Figure 29B:
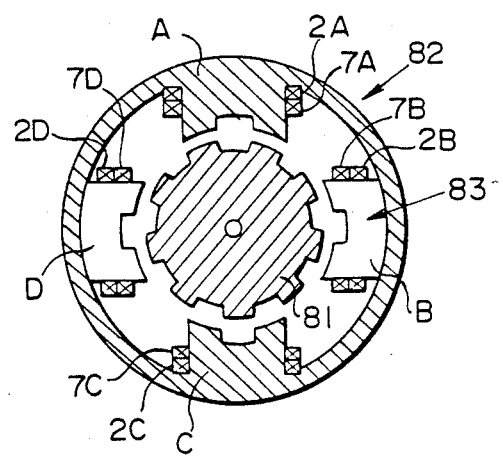
FIG. 29 (b) is a sectional view of the detection head unit taken along line b—b in FIG. 29(a)

In the embodiment shown in FIG. 24(a), the poles A–D of the stator 79 are provided on the same circumference. Alternatively, the poles A and C may be provided in an axially displaced position relative to the poles B and D as shown in FIGS. 29(a) and 29(b) while the same angular position as in FIG. 24(a) is maintained. This design enables elongation of the rotor 76. In FIG. 29(a), the rotor 81 is somewhat longer in the axial length than the rotor 77 shown in FIG. 1. A stator 82 has only a pair of poles A and C changing in a differential manner and a stator 83 has also only a pair of poles B and D changing in a differential manner. These stators 82 and 83 are disposed on the same shaft in such a manner that the pole pairs A, C and B, D are spaced from each other by 90° in the circumferential direction. Each of the poles A, B, C and D has, as in the poles shown in FIG. 24(a), primary coils 2A–2D and secondary coils 7A–7D wound thereon.

Figure 30A:
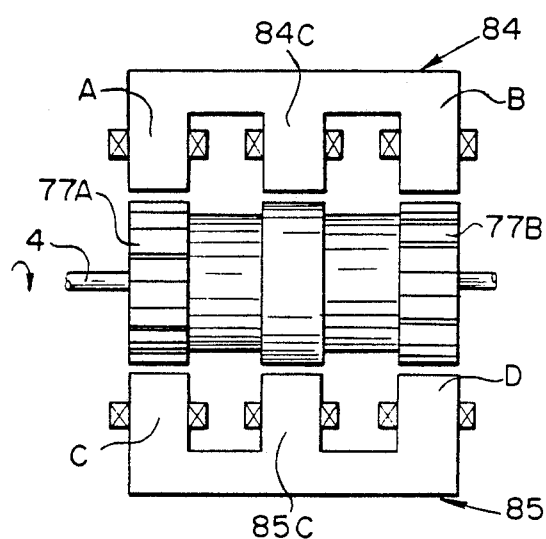
FIG. 30(a) is a side view of another embodiment of the high resolution type detection head unit.
Figure 30B:
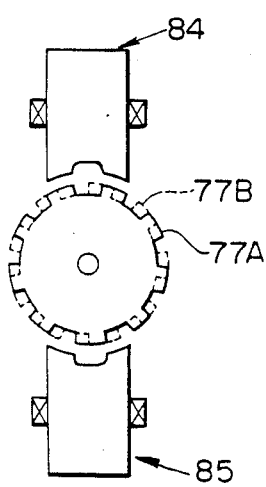
FIG. 30(b) is a front view of the detection head unit shown in FIG. 30(a)
Figure 31A:
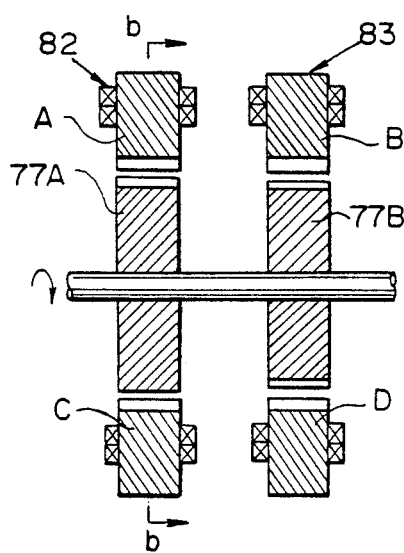
FIG. 31(a) is an axial sectional view of still another high resolution type detection head unit.
Figure 31B:
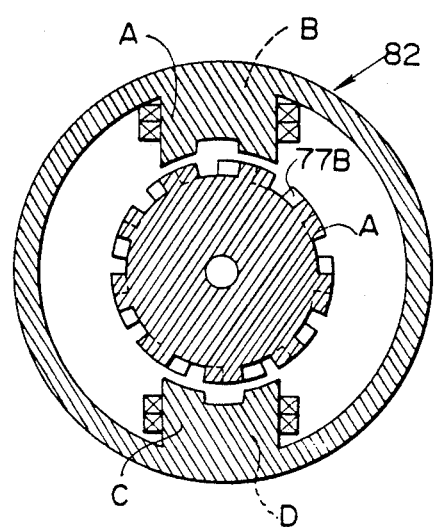
FIG. 31(b) is a sectional view of the detection head unit taken along line b—b in FIG. 31(a)

Alternatively, as shown in FIGS. 30(a)–31(b), the stator and rotor may be so designed that the relative angular position of the pole pairs A, C and B, D is the same as that in the above described embodiments and a mechanical phase difference of ¼ pitch is produced in rotors 77A and 77B corresponding to these pole pairs. FIGS. 30(a) and 30(b) show stators 84 and 85 which are of an E-shaped section and are opposing to each other in a radial direction. Each of the poles A-D has a primary coil wound thereon and each of central poles 84C and 85C has a secondary coil wound thereon. FIGS. 31(a) and 31(b) show circular stators 82 and 83 respectively having pole pairs A, C and B, D which are in the same angular positions. A mechanical phase difference of ¼ pitch is produced in the teeth of rotors 77A and 77B so that the detection head unit shown in FIGS. 31(a) and 31(b) work in the same manner as that shown in FIGS. 29(a) and 29(b).

Figure 32:
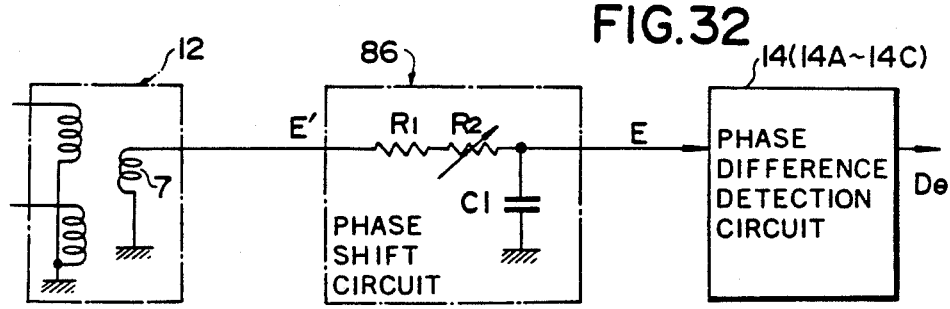
FIG. 32 is a diagram of an example of phase shift circuit for adjusting origin between the secondary coil output terminal and phase difference detection circuit.

In mounting the detection head unit to a mechanical system in which detection is to be made, the origin of the mechanical system and that of the detection head unit must be registered accurately and this requires a precision work. For dispensing with such precision work, a phase shift circuit 86 for adjusting the origin may be provided between a secondary coil 7 and a circuit 14 (or 14A–14C) for detecting phase difference as showns in FIG. 32. The phase shift circuit 86 includes a resistor $R_1$, a variable resistor $R_2$ and a capacitor $C_1$ and produces a signal E which has been phase shifted by suitably delaying an input signal E' in accordance with time constant of the circuit. The time constant of the circuit, i.e., amount of phase shift, is adjusted by operating the variable resistor $R_2$.

The Detection head unit 12 is mounted to a shaft of the mechanical system in which detection is to be made by suitable means such as screws. If the origins of the detection head unit and the mechanical system are not in perfect register with each other, phase difference corresponding to the mounting error is produced in the output signal E'. Assuming now that the present position of the mechanical system is in the origin and the amount of phase shift in the phase shift circuit 86 is 0, the phase of the output signal E' of the detection head unit 12 is not shifted but is directly applied to the phase difference detection circuit 14 with a result that output data $D_\theta$ of the phase difference detection circuit 14 assumes a value corresponding to the mounting error. This data $D_\theta$ is displayed by a suitable indicator (not shown) and phase shifting of a suitable amount is effected in the phase shift circuit 86 by manipulating the variable resistor $R_2$, whereby a signal E in which the phase difference corresponding to the mounting error is compensated can be obtained from the phase shift circuit 86. In this manner, an electrical adjustment of the origin is performed by the phase shift circuit 86 and, accordingly, an accurate phase shift detection (i.e., detection of the angle) can be made on the basis of the position detection signal E which has been adjusted in the origin. Consequently, a high degree of precision in mounting the detection head unit to the mechanical system is not required, thus facilitating the mounting work.

In the above described embodiments, the number of the pole pairs of the stator is not limited to two pairs of A, C and B, D but may be suitably increased. The two poles A and C (or B and D) which constitute a pair are opposed to each other in a radial direction (i.e., at an interval of 180°) but the relative position of these poles is not limited to this. The primary coils 2A–2D and the secondary coils 7A–7D need not be connected in series but may be wound such that AC signals are individually applied to the respective coils of the primary coils and outputs are obtained individually from the secondary coils and thereafter are added together or subtracted from each other. In the high resolution type detection head, the recesses 1a, 3a of the teeth need not be a vacant space but a proper non-magnetic material may be filled in these recesses.

We claim:

1. A rotational position detection device comprising:
   stator means having a plurality of poles which include end portions, said poles being arranged in a predetermined arrangement, said stator means further having primary coils being wound on the respective poles and secondary coils being wound on the respective poles in association with the respective primary coils;
   rotor means of such configuration as to oppose the end portions of the respective poles with gaps therebetween, change reluctance of magnetic paths passing the respective poles in accordance with a rotational position and receive a rotational movement or displacement by rotation, which is an object of detection from outside;
   a clock pulse generator;
   reference AC signal generation means for generating reference AC signals having a predetermined frequency and being out of phase with each other in response to a clock pulse generated by said clock pulse generator, said reference AC signal generation means comprising a counter for counting said clock pulse signal and a circuit responsive to an output of the counter to produce said plural reference AC signals;
   means for exciting each of said primary coils on said poles with any one of reference AC signals, each pole excitation signal being out of phase with the excitation signals of adjacent poles by a predetermined electrical angle;
   means for summing outputs of the respective secondary coils and thereby generating an output signal resulting by phase shifting the reference AC signals in accordance with the rotational position of said rotor means; and
   phase difference detection means for digitally detecting the phase difference between a predetermined one of said reference AC signals and said output signal as a digital count representing absolute rotational position data, said phase difference detection means comprising a circuit for latching a count of said counter at a predetermined electrical phase angle of said output signal to obtain said digital count.

2. A rotational position detection device as defined in claim 1 wherein:
said stator means comprises a stator in which two poles constituting a pole pair are circumferentially spaced by 180° from each other and two of such pole pairs are provided at a circumferential interval of about 90° from each other;
one of the reference AC signals exciting one of said pole pairs is a sine wave signal and the other reference AC signal exciting the other pole pair is a cosine wave signal;
the end portion of each of the poles of said stator is directed toward the axis of rotation of said rotor means; and
said rotor means is inserted in an internal space formed in said stator and of a cylindrical configuration which is eccentric from the axis of rotation.

3. A rotational position detection device as defined in claim 1 wherein:
said stator means comprises a stator in which two poles constituting a pole pair are circumferentially spaced by 180° from each other and two of such pole pairs are provided at a circumferential interval of about 90° from each other;
one of the reference AC signals exciting one of said pole pairs is a sine wave signal and the other reference AC signal exciting the other pole pair is a cosine wave signal;
the end portion of each of the poles of said stator is directed toward the axis of rotation of said rotor means; and
said rotor means is inserted in an internal space formed in said stator and of a cylindrical configuration concentric with the axis of rotation having an oblique end surface with respect to the axis of rotation.

4. A rotational position detection device as defined in claim 1 wherein;
said rotor means comprises a rotor having teeth of a predetermined pitch; and
said stator means comprises a stator having teeth of a pitch corresponding to the teeth of said rotor on the respective poles.

5. A rotational position detection device as defined in claim 1 which further comprises a phase shift circuit of a variable shift amount for electrically shifting the electrical phase of the output signal of said outputs summing means by a predetermined amount, the shift amount in said phase shift circuit being determined so that the origin of the rotational position detection device is in register with the origin of an object of detection.

6. A rotational position detection device comprising:
stator means having a plurality of primary poles arranged in a predetermined arrangement, a secondary pole, primary coils being wound on respective primary poles and a secondary coil being wound on the secondary pole, said poles having end portions;
rotor means of such configuration as to oppose the end portions of the respective primary poles and the secondary pole with gaps therebetween, change reluctance of magnetic paths passing the respective primary poles in accordance with a rotational position and receive a rotational movement or displacement by rotation which is an object of detection from outside;
a clock pulse generator;
reference AC signal generation means for generating reference AC signals having a predetermined frequency and being out of phase with each other in response to a clock generated by said clock pulse generator, said reference AC signal generation means comprising a counter for counting said clock pulse signal and a circuit responsive to an output of the counter to produce said plural reference AC signals;
means for exciting each of said primary coils on said poles with any one of reference AC signals, each pole excitation signal being out of phase with the excitation signals of adjacent poles by a predetermined electrical angle and thereby producing in the secondary coil an output signal resulting by phase shifting the reference AC signals in accordance with the rotational position of said rotor means; and 7. A rotational position detection device as defined in phase difference detection means for digitally detecting the phase difference between a predetermined one of said reference AC signals and said output signal as a digital count representing absolute rotational position data, said phase difference detection means comprising a circuit for latching a count of said counter at a predetermined electrical phase angle of said output signal to obtain said digital count. claim 6 wherein;
said secondary pole is disposed in the central portion of said stator means;
said primary poles are disposed along the circumferential portion of said stator means;
the end portions of the respective poles are directed parallel to the axis of rotation of said rotor means; and
said rotor means comprises a disk opposing the end portions of the poles of said stator means with predetermined gaps and being eccentric from the axis of rotation.

8. A rotational position detection device as defined in claim 6 wherein;
said secondary pole is disposed in the central portion of said stator means;
said primary poles are disposed along the circumferential portion of said stator means;
the end portions of the respective poles are directed parallel to the axis of rotation of said rotor means; and
said rotor means comprises a disk having an oblique surface with respect to the axis of rotation, said oblique surface being opposed to the end portions of the respective poles of said stator means.

9. A rotational position detection device as defined in claim 6 wherein;
said rotor means comprises a cylindrical core having oblique surfaces with respect to the axis of rotation at both ends of said cylindrical core; and
said stator means comprises an E-shaped stator having said secondary pole at its center and said primary poles on its opposite sides, the end portion of said secondary pole being opposed to the side surface of said cylindrical core, and the end portions of said primary poles being opposed to the respective oblique ends of said cylindrical core.

10. A rotational position detection device as defined in claim 6 wherein;
said rotor means comprises a rotor having teeth of a predetermined pitch; and said stator means comprises a stator having teeth of a pitch corresponding to the teeth of said rotor on the respective primary poles.

11. A rotational position detection device as defined in claim 6 which further comprises a phase shift circuit of a variable shift amount for electrically shifting the electrical phase of the output signal of said secondary coil by a predetermined amount, the shift amount in said phase shift circuit being determined so that the origin of the rotational position detection device is in register with the origin of an object of detection.

12. A rotational position detection device as defined in claim 1 which further comprises a speed detection means for detecting the rotation speed of the rotor means on the basis of the change of the absolute rotational position data obtained by said phase difference detection means.

13. A rotational position detection device as defined in claim 12 which further comprises an acceleration detection means for detecting the rotational acceleration of the rotor means on the basis of the change of the detected rotation speed data.

14. A rotational position detection device as defined in claim 6 which further comprises a speed detection means for detecting the rotation speed of the rotor means on the basis of the change of the absolute rotational position data obtained by said phase difference detection means.

15. A rotational position detection device as defined in claim 14 which further comprises an acceleration detection means for detecting the rotational acceleration of the rotor means on the basis of the change of the detected rotation speed data.

16. A digital angular position detection device having:
- a plurality of poles with primary coils wound thereon and excited by out-of-phase signals derived from a clock pulse source and having secondary coils wound on said poles in association with said primary coils to produce an output signal,
- a rotor means receiving a rotational movement or displacement by rotation such that the reluctance change of magnetic paths passing the respective poles varies in accordance with the rotational position of said rotor means, said rotational movement or displacement being an object of detection; and
- a phase difference detection circuit comprising:
  - a counter incremented in synchronization with said clock pulses,
  - a means for initializing the count of said counter in response to a predetermined reference point of one of said exciting signals, and
  - a means for outputting the count of said counter at a predetermined point of the output signal, the digital output thereby directly representing the rotational angle of the rotor means in predetermined incremental units.

17. The digital angular position detection device as claimed in claim 16 wherein the predetermined incremental units of the counter output represent units of $\pi/M$, where M is a predetermined integer.

18. The digital angular position detection device as claimed in claim 17 wherein said phase difference detection circuit includes:
- a data register means for temporarily storing and outputting the count from said counter,
- means for producing an input reference pulse at a predetermined part of one of said exciting signals,
- means for producing an output reference pulse at a predetermined part of the secondary coil output signal corresponding to the input reference pulse, wherein
said counter means is reset by said input reference pulse and said data register means stores the clock pulse count and outputs such count in response to the output reference pulse.

19. A digital angular position detection device having:
- a plurality of poles with primary coils wound thereon and excited by out-of-phase signals derived from a clock pulse source and having secondary coils wound on said poles in association with said primary coils to produce an output signal,
- a rotor means receiving a rotational movement or displacement by rotation such that the reluctance change of magnetic paths passing the respective poles varies in accordance with the rotational position of said rotor means, said rotational movement or displacement being an object of detection;
said clock pulse source comprising:
  - a clock pulse generator,
  - a counter for counting clock pulses generated by said clock pulse generator, and
  - a circuit responsive to an output of the counter to produce said out-of-phase signals; and
  - a phase difference detection circuit for sampling the count of said counter at a predetermined point of the output signal produced by the secondary coils, the digital count thereby directly representing the rotational angle of the rotor means in predetermined incremental units.

20. The digital angular position detection device as claimed in claim 19 wherein the predetermined incremental units represent units of $\pi/M$, where M is a predetermined integer.

21. The digital angular position detection device as claimed in claim 20 wherein said phase difference detection circuit includes:
means for producing a sampling reference pulse at a predetermined part of the secondary coil output signal, and
a data register means for sampling the count from said counter in response to said sampling reference pulse and temporarily storing the sampled count.

* * * * *